US012006836B2

(12) United States Patent
Mongillo et al.

(10) Patent No.: US 12,006,836 B2
(45) Date of Patent: Jun. 11, 2024

(54) COOLING ARRANGEMENT FOR GAS TURBINE ENGINE COMPONENT

(71) Applicant: RAYTHEON TECHNOLOGIES CORPORATION, Farmington, CT (US)

(72) Inventors: Dominic J. Mongillo, West Hartford, CT (US); Emma J. Place, New Hartford, CT (US); Christopher J. Peters, Los Lunas, NM (US); Jeffrey J. DeGray, Somers, CT (US); Timothy J. Jennings, New Britain, CT (US); Raymond Surace, Newington, CT (US); Jeremy B. Fredette, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/856,042

(22) Filed: Jul. 1, 2022

(65) Prior Publication Data

US 2023/0250725 A1 Aug. 10, 2023

Related U.S. Application Data

(60) Provisional application No. 63/217,788, filed on Jul. 2, 2021.

(51) Int. Cl.
*F01D 5/18* (2006.01)
(52) U.S. Cl.
CPC ............ *F01D 5/18* (2013.01); *F05D 2220/32* (2013.01); *F05D 2230/60* (2013.01); *F05D 2260/20* (2013.01)

(58) Field of Classification Search
CPC ..... F01D 5/18; F05D 2260/20; F05D 2230/60
See application file for complete search history.

(56) References Cited

U.S. PATENT DOCUMENTS 4,236,870 A * 12/1980 Hucul, Jr. ................ F01D 5/20
415/115
4,474,532 A * 10/1984 Pazder .................... F01D 5/187
415/115

(Continued)

FOREIGN PATENT DOCUMENTS

| EP | 1443178 | 8/2004 |
|---|---|---|
| EP | 3330487 | 6/2018 |
| WO | 20150181488 | 12/2015 |

OTHER PUBLICATIONS

European Search Report for European Patent Application No. 22182899.9 dated Nov. 24, 2022.

(Continued)

*Primary Examiner* — Courtney D Heinle
*Assistant Examiner* — Theodore C Ribadeneyra
(74) *Attorney, Agent, or Firm* — Carlson, Gaskey & Olds, P.C.

(57) ABSTRACT

An airfoil for a gas turbine engine according to an example of the present disclosure includes an airfoil section extending in a radial direction from a root section to a tip portion. The airfoil section has an external wall and an internal wall. The airfoil section establishes an internal cooling arrangement including a first cooling passage having a first section and a tip flag section. The tip flag section extends in the chordwise direction along the tip portion from the first section. The first section includes a plurality of branched paths established by at least one turning vane.

16 Claims, 13 Drawing Sheets

(56) References Cited

U.S. PATENT DOCUMENTS

| | | | | |
|---|---|---|---|---|
| 4,753,575 | A | * | 6/1988 | Levengood ............ F01D 5/186 415/115 |
| 4,767,268 | A | * | 8/1988 | Auxier .................... F01D 5/187 415/115 |
| 5,176,499 | A | | 1/1993 | Damlis et al. |
| 5,464,479 | A | | 11/1995 | Kenton et al. |
| 6,347,923 | B1 | * | 2/2002 | Semmler ................ F01D 5/187 416/97 R |
| 6,824,359 | B2 | | 11/2004 | Chlus et al. |
| 6,923,623 | B2 | | 8/2005 | Cleveland et al. |
| 6,974,308 | B2 | | 12/2005 | Halfmann et al. |
| 7,300,250 | B2 | | 11/2007 | Papple |
| 7,377,746 | B2 | | 5/2008 | Brassfield et al. |
| 7,413,403 | B2 | | 8/2008 | Cunha et al. |
| 7,597,539 | B1 | | 10/2009 | Liang |
| 7,625,178 | B2 | | 12/2009 | Morris et al. |
| 7,665,968 | B2 | * | 2/2010 | Mongillo, Jr. .......... F01D 5/187 416/97 R |
| 7,857,587 | B2 | | 12/2010 | Correia et al. |
| 8,011,889 | B1 | | 9/2011 | Liang |
| 8,092,179 | B2 | | 1/2012 | Paauwe et al. |
| 8,702,391 | B2 | * | 4/2014 | Bregman ................ F01D 5/187 416/97 R |
| 9,546,554 | B2 | * | 1/2017 | Crites .................... F01D 5/187 |
| 9,890,644 | B2 | | 2/2018 | Tran et al. |
| 10,563,521 | B2 | | 2/2020 | Clum et al. |
| 10,655,476 | B2 | * | 5/2020 | Halfmann ............... F01D 5/187 |
| 10,731,478 | B2 | * | 8/2020 | Xu ......................... F01D 5/187 |
| 10,766,065 | B2 | | 9/2020 | Tallman |
| 10,934,856 | B2 | * | 3/2021 | Srinivasan ............... F02C 3/04 |
| 2004/0151586 | A1 | | 8/2004 | Chlus et al. |
| 2005/0129516 | A1 | | 6/2005 | Rinck et al. |
| 2007/0128033 | A1 | | 6/2007 | Lee et al. |
| 2008/0056908 | A1 | | 3/2008 | Morris et al. |
| 2010/0023294 | A1 | | 1/2010 | Fan et al. |
| 2011/0076405 | A1 | | 3/2011 | Raji et al. |
| 2014/0083116 | A1 | * | 3/2014 | Crites .................... F01D 5/187 416/97 R |
| 2014/0093386 | A1 | * | 4/2014 | Pointon .................. F01D 5/20 416/95 |
| 2017/0183969 | A1 | | 6/2017 | Dujol et al. |
| 2017/0211396 | A1 | * | 7/2017 | Mongillo ................. F01D 9/02 |
| 2018/0050386 | A1 | | 2/2018 | Talman |
| 2018/0156042 | A1 | | 6/2018 | Mongillo, Jr. et al. |
| 2018/0156043 | A1 | | 6/2018 | Clum et al. |
| 2018/0156045 | A1 | | 6/2018 | Clum et al. |
| 2018/0156049 | A1 | | 6/2018 | Clum et al. |
| 2018/0306035 | A1 | | 10/2018 | Eneau |
| 2019/0178088 | A1 | | 6/2019 | Meier et al. |
| 2020/0102841 | A1 | | 4/2020 | Peters et al. |
| 2020/0190998 | A1 | * | 6/2020 | Xu ........................ F01D 5/3015 |
| 2022/0098988 | A1 | * | 3/2022 | LoRicco ................. F01D 5/187 |

OTHER PUBLICATIONS

European Search Report for European Patent Application No. 19200847.2 dated Feb. 19, 2020.

International Search Report and Written Opinion for International application No. PCT/US2014/047991 dated Nov. 20, 2014.

International Preliminary Report on Patentability for International Application No. PCT/US2014/047991 dated Feb. 18, 2016.

Supplementary European Search Report for European Patent Application No. 14834675.2 dated Mar. 27, 2017.

* cited by examiner

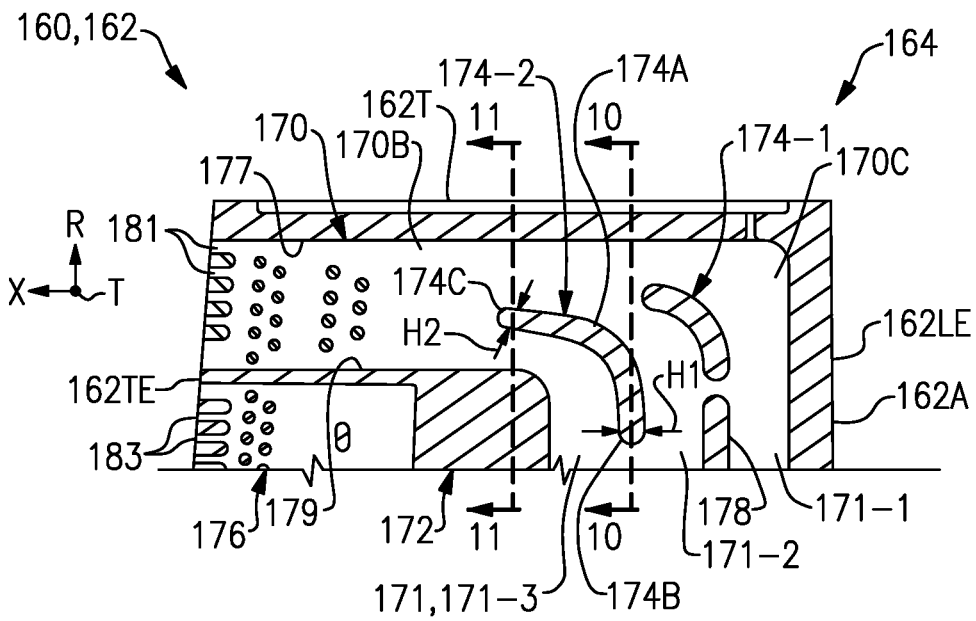
FIG.9
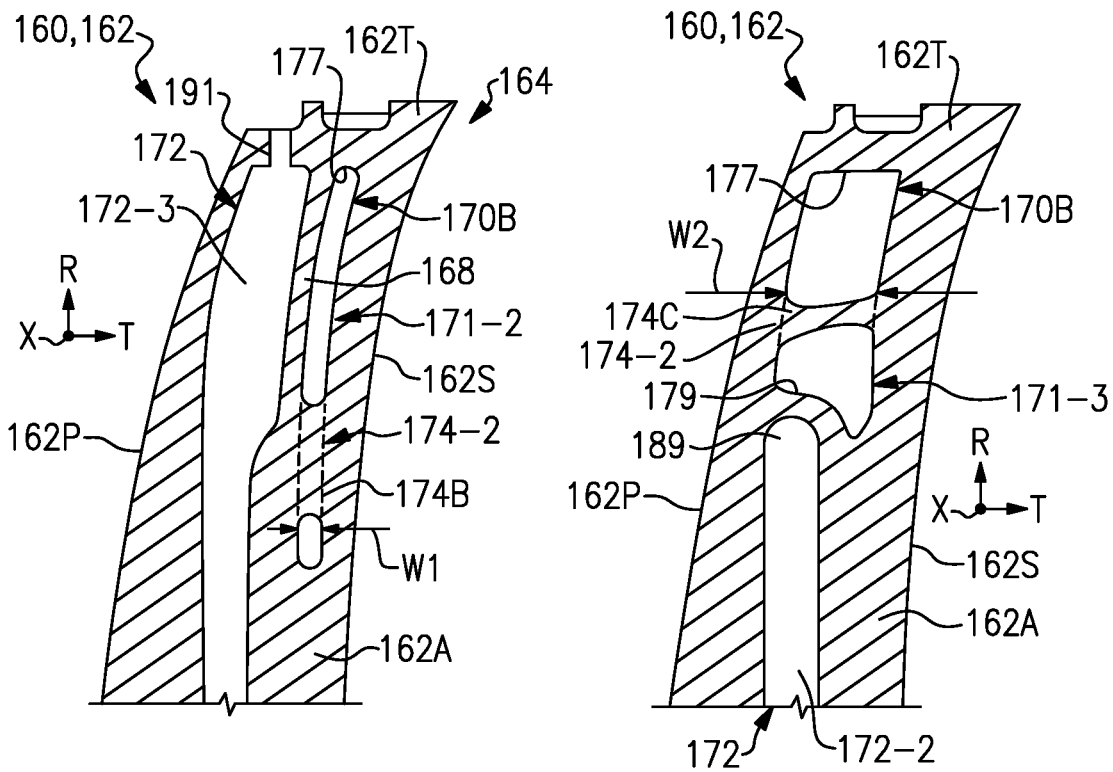
FIG.10
FIG.11

COOLING ARRANGEMENT FOR GAS TURBINE ENGINE COMPONENT

CROSS-REFERENCE TO RELATED APPLICATION

The present disclosure claims the benefit of U.S. Provisional Patent Application No. 63/217,788, filed Jul. 2, 2021.

BACKGROUND

This disclosure relates to cooling schemes for a component, such as a component of a gas turbine engine.

Gas turbine engines may include a fan for propulsion air. The fan may also deliver air into a core engine where it is compressed. The compressed air is then delivered into a combustion section, where it is mixed with fuel and ignited. The combustion gas expands downstream over and drives turbine blades. Static vanes may be positioned adjacent to the turbine blades to control the flow of the products of combustion.

Due to exposure to hot combustion gases, numerous components of a gas turbine engine, such as turbine blades and vanes, may include cooling schemes that circulate airflow to cool the component during engine operation. Thermal energy is transferred from the component to the airflow as the airflow circulates through the cooling scheme to cool the component.

SUMMARY

An airfoil for a gas turbine engine according to an example of the present disclosure includes an airfoil section extending in a radial direction from a root section to a tip portion. The airfoil section has an external wall and an internal wall. The external wall defines pressure and suction sides extending in a chordwise direction between a leading edge and a trailing edge, and the pressure and suction sides are spaced apart in a thickness direction between the leading edge and the trailing edge. The airfoil section establishes an internal cooling arrangement including a first cooling passage having a first section and a tip flag section. The first section extends in the radial direction from the root section. The tip flag section extends in the chordwise direction along the tip portion from the first section to the trailing edge. The first section includes a plurality of branched paths established by at least one turning vane that interconnects the internal wall and the external wall. The at least one turning vane has an arcuate profile and is arranged such that the plurality of branched paths join together along the tip flag section. The internal wall extends in the chordwise direction such that the plurality of branched paths are bounded in the thickness direction between the internal wall and the external wall adjacent the at least one turning vane.

In a further embodiment of any of the foregoing embodiments, the plurality of branched paths includes first, second and third branched paths, and the at least one turning vane includes a first turning vane and a second turning vane that cooperate to separate the first, second and third branched paths.

In a further embodiment of any of the foregoing embodiments, each of the first and second turning vanes extends between an upstream end and a downstream end. The upstream end of the first turning vane is aligned with a first rib relative to the chordwise direction. The upstream end of the second turning vane is aligned with a second rib relative to the chordwise direction, and the first and second ribs cooperate to separate the first, second and third branched paths.

In a further embodiment of any of the foregoing embodiments, the tip flag portion is established along a reference plane intersecting the leading and trailing edges and the pressure and suction sides, the tip flag portion expands outwardly in the thickness direction along the reference plane from the second branched path towards the trailing edge, and the internal wall follows along the second branched path in the reference plane.

In a further embodiment of any of the foregoing embodiments, the upstream end of the second turning vane establishes a first aspect ratio that is less than or equal to about 3:2. The downstream end of the second turning vane establishes a second aspect ratio that is greater than or equal to about 2:1. The airfoil section includes a radially inwardly facing wall and a radially outwardly facing wall extending in the chordwise direction to bound the tip flag section, and the downstream end of the second turning vane is aligned with the radially outwardly facing wall relative to the chordwise direction.

In a further embodiment of any of the foregoing embodiments, each of the first and second turning vanes is segmented between the upstream and downstream ends to establish at least one crossover passage interconnecting an adjacent pair of the branched paths.

In a further embodiment of any of the foregoing embodiments, the internal cooling arrangement includes a serpentine cooling passage including a first section, a second section and a third section. The second section interconnects the first section and the third section, and the first section extends outwardly from the root section and the third section extends inwardly from the tip portion relative to the radial direction. The tip flag section and the third section of the serpentine cooling passage are situated on opposite sides of the internal wall relative to the thickness direction.

In a further embodiment of any of the foregoing embodiments, the serpentine cooling passage is established between the internal wall and the pressure side, and the branched paths are established between the internal wall and the suction side.

In a further embodiment of any of the foregoing embodiments, the airfoil section extends in the radial direction from a platform section to the tip portion. The branched paths are dimensioned to branch outwardly from a trunk of the first section at a position inward of the platform section relative to the radial direction.

In a further embodiment of any of the foregoing embodiments, the tip flag portion includes a first set of exit ports along the trailing edge, the internal cooling arrangement includes a leading edge cooling passage bounded by the external wall along the leading edge, and a trailing edge cooling passage including a second set of exit ports along the trailing edge that are inward of the first set of exit ports relative to the radial direction.

In a further embodiment of any of the foregoing embodiments, the airfoil is a turbine blade.

A casting core assembly for a gas turbine engine component according to an example of the present disclosure includes a skin core corresponding to a first cooling passage of an airfoil. The first cooling passage includes a first portion and a tip flag portion joined at a first bend. The tip flag portion is dimensioned to extend from the first bend to a trailing edge of the airfoil. The skin core includes a first portion corresponding to the first section and a tip flag portion corresponding to the tip flag portion, and the tip flag portion includes a row of protrusions corresponding to a first row of exit slots along the trailing edge of the airfoil. The skin core includes at least one arcuate slot corresponding to at least one turning vane of the airfoil, and the skin core includes a plurality of branched sections corresponding to a plurality of branched paths along the first section. The plurality of branched sections bound the at least one arcuate slot such that the plurality of branched sections join along the tip flag portion.

In a further embodiment of any of the foregoing embodiments, the at least one arcuate slot extends between a first end and a second end, the first portion includes at least one elongated slot bounded by an adjacent pair of the branched sections, and the first end of the at least one arcuate slot is aligned with the at least one elongated slot relative to a chordwise direction.

In a further embodiment of any of the foregoing embodiments, the at least one arcuate slot extends between a first end and a second end. The skin core includes at least one bridge spanning between an adjacent pair of the branched sections such that the at least one arcuate slot is interrupted between the first and second ends, and the at least one bridge corresponds to at least one crossover passage interconnecting an adjacent pair of the branched paths.

A further embodiment of any of the foregoing embodiments includes a serpentine core corresponding to a serpentine cooling passage. The skin core and the serpentine core are arranged in spaced relationship such that the first cooling passage and the serpentine cooling passage are opposite sides along an internal wall of the airfoil relative to a thickness direction.

A further embodiment of any of the foregoing embodiments includes a leading edge core corresponding to a leading edge cooling passage bounded by an external wall along a leading edge of the airfoil. A trailing edge core corresponds to a trailing edge cooling passage including a second set of exit ports along the trailing edge of the airfoil. The tip flag portion of the skin core is at least partially aligned with the trailing edge core relative to the thickness direction, and the serpentine core is spaced apart from and forward of the trailing edge core relative to the chordwise direction.

In a further embodiment of any of the foregoing embodiments, the trailing edge core includes a second row of protrusions corresponding to a second row of exit ports along the trailing edge of the airfoil.

A further embodiment of any of the foregoing embodiments includes at least one connector that joins the leading edge core and the serpentine core. The at least one connector corresponds to at least one crossover passage extending between the leading edge cooling passage and the serpentine cooling passage.

In a further embodiment of any of the foregoing embodiments, the skin core includes a protrusion extending from the first bend. The protrusion corresponds to a purge passage interconnecting the first cooling passage and an aperture along an external surface of the airfoil, and the purge passage is dimensioned to eject particulate from the first cooling passage in operation.

A method of forming an airfoil for a gas turbine engine according to an example of the present disclosure includes forming a skin core, forming a serpentine core, forming a leading edge core, and forming a trailing edge core, and assembling the skin core, the serpentine core, the leading edge core and the trailing edge core together establish a core assembly. An airfoil is formed around the core assembly. The skin core corresponds to a first cooling passage of the airfoil. The first cooling passage includes a first section and a tip flag section. The first section extends in a radial direction, and the tip flag section extends in a chordwise direction from the first section to a trailing edge of the airfoil. The leading edge core corresponds to a leading edge cooling passage adjacent to a leading edge of the airfoil. The trailing edge core corresponds to a trailing edge cooling passage adjacent to the trailing edge of the airfoil. The skin core includes at least one arcuate slot corresponding to at least one turning vane outward of the trailing edge cooling passage relative to the radial direction. The skin core includes a plurality of branched sections corresponding to a plurality of branched paths along the first section of the first cooling passage that join along the tip flag section.

In a further embodiment of any of the foregoing embodiments, the step of forming the airfoil includes forming an airfoil section including an external wall and an internal wall. The external wall defines pressure and suction sides extending in a chordwise direction between the leading edge and the trailing edge. The pressure and suction sides are spaced apart in a thickness direction between the leading edge and the trailing edge. The tip flag section of the first cooling passage is established between the suction side of the airfoil and a first side of the internal wall relative to the thickness direction, and the serpentine cooling passage is established between the pressure side of the airfoil and a second side of the internal wall opposed to the first side relative to the thickness direction.

In a further embodiment of any of the foregoing embodiments, the step of forming the airfoil includes forming a platform section and a root section. The airfoil section extends outwardly from the platform section to a tip portion relative to the radial direction. The root section extends inwardly from the platform section relative to the radial direction and is dimensioned to mount the airfoil to a rotatable hub. The internal wall extends inwardly from the tip portion relative to the radial direction. The tip flag section is established along the tip portion of the airfoil. The branched paths are dimensioned to branch outwardly from a trunk of the first section at a position inward of the platform section relative to the radial direction. The assembly step includes coupling the skin core, the serpentine core, the leading edge core and the trailing edge core to each other at a position corresponding to the root section.

An airfoil for a gas turbine engine according to an example of the present disclosure includes an airfoil section extending in a radial direction from a root section to a tip portion. The airfoil section has an external wall defining pressure and suction sides extending in a chordwise direction between a leading edge and a trailing edge, and the pressure and suction sides are spaced apart in a thickness direction between the leading edge and the trailing edge. A platform section between the root section and the tip portion is relative to the radial direction. The airfoil section establishes an internal cooling arrangement including a first cooling passage having a first section and a tip flag section joined at a junction. The first section extends in the radial direction from the root section, and the tip flag section extends in the chordwise direction along the tip portion from the junction to the trailing edge. The first section includes a plurality of branched paths dimensioned to branch outwardly from a trunk of the first section at a position inward of the platform section relative to the radial direction, and the plurality of branched paths are dimensioned to join together along the junction.

In a further embodiment of any of the foregoing embodiments, the plurality of branched paths includes first, second and third branched paths separated by a plurality of turning vanes at the junction.

In a further embodiment of any of the foregoing embodiments, the position includes a first position and a second position. The third branched path branches from the trunk at the first position, and the trunk divides into the first and second branched paths at the second position radially outward of the first position relative to the radial direction.

In a further embodiment of any of the foregoing embodiments, the airfoil section includes an internal wall. The internal cooling arrangement includes a serpentine cooling passage including a first section, a second section and a third section. The second section interconnects the first section and the third section, and the first section extends outwardly from the root section and the third section extends inwardly from the tip portion relative to the radial direction. The tip flag section and the third section of the serpentine cooling passage are situated on opposite sides of the internal wall relative to the thickness direction.

In a further embodiment of any of the foregoing embodiments, the serpentine cooling passage is established between the internal wall and the pressure side, and the branched paths are established between the internal wall and the suction side.

In a further embodiment of any of the foregoing embodiments, the airfoil is a turbine blade.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 9 illustrates a side view of selected portions of the component of FIG. 4.

FIG. 10 is a sectional view taken along line 10-10 of the component of FIG. 9.

FIG. 11 is a sectional view taken along line 11-11 of the component of FIG. 9.

Like reference numbers and designations in the various drawings indicate like elements.

DETAILED DESCRIPTION

Figure 1:
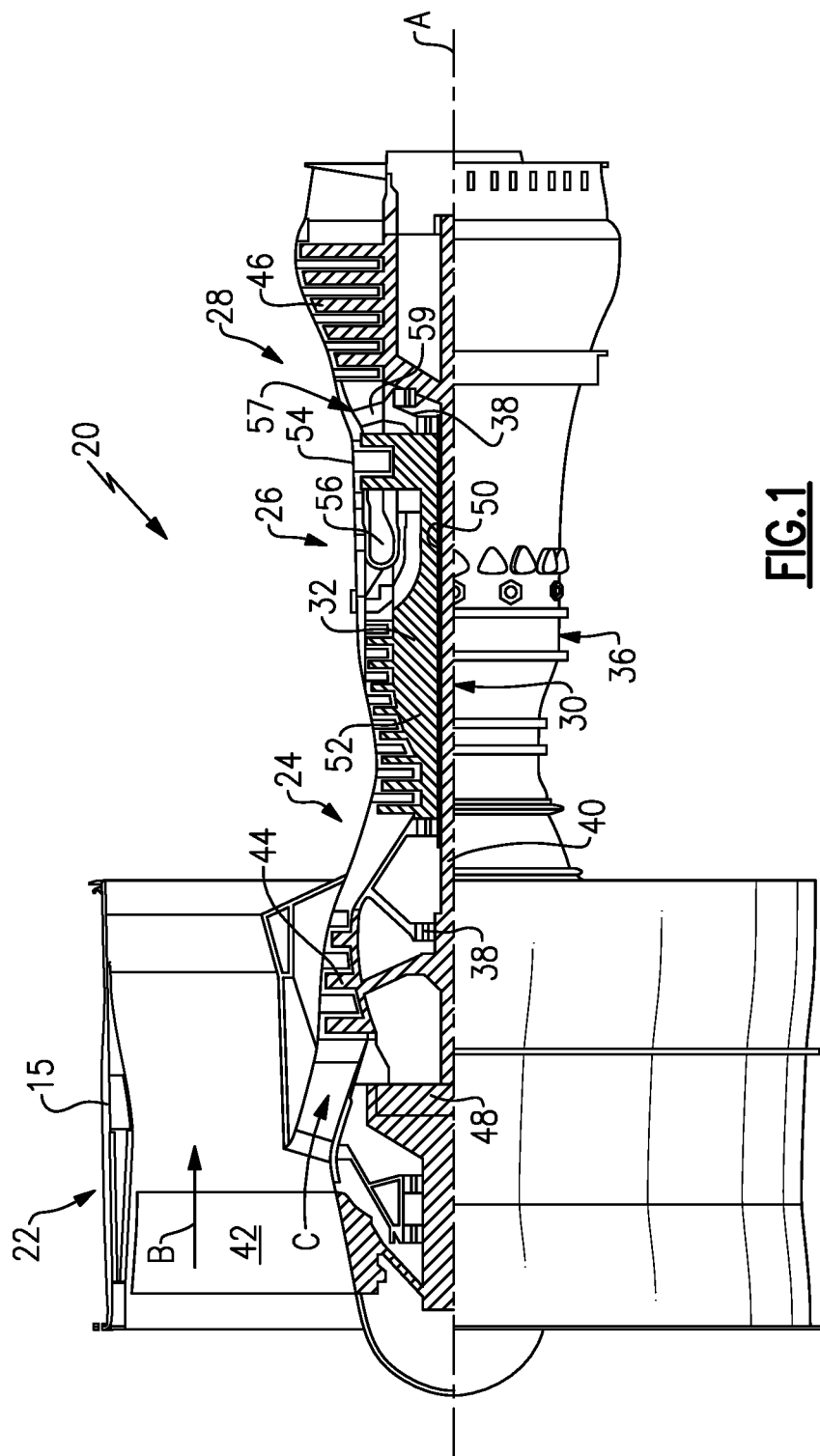
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"— is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
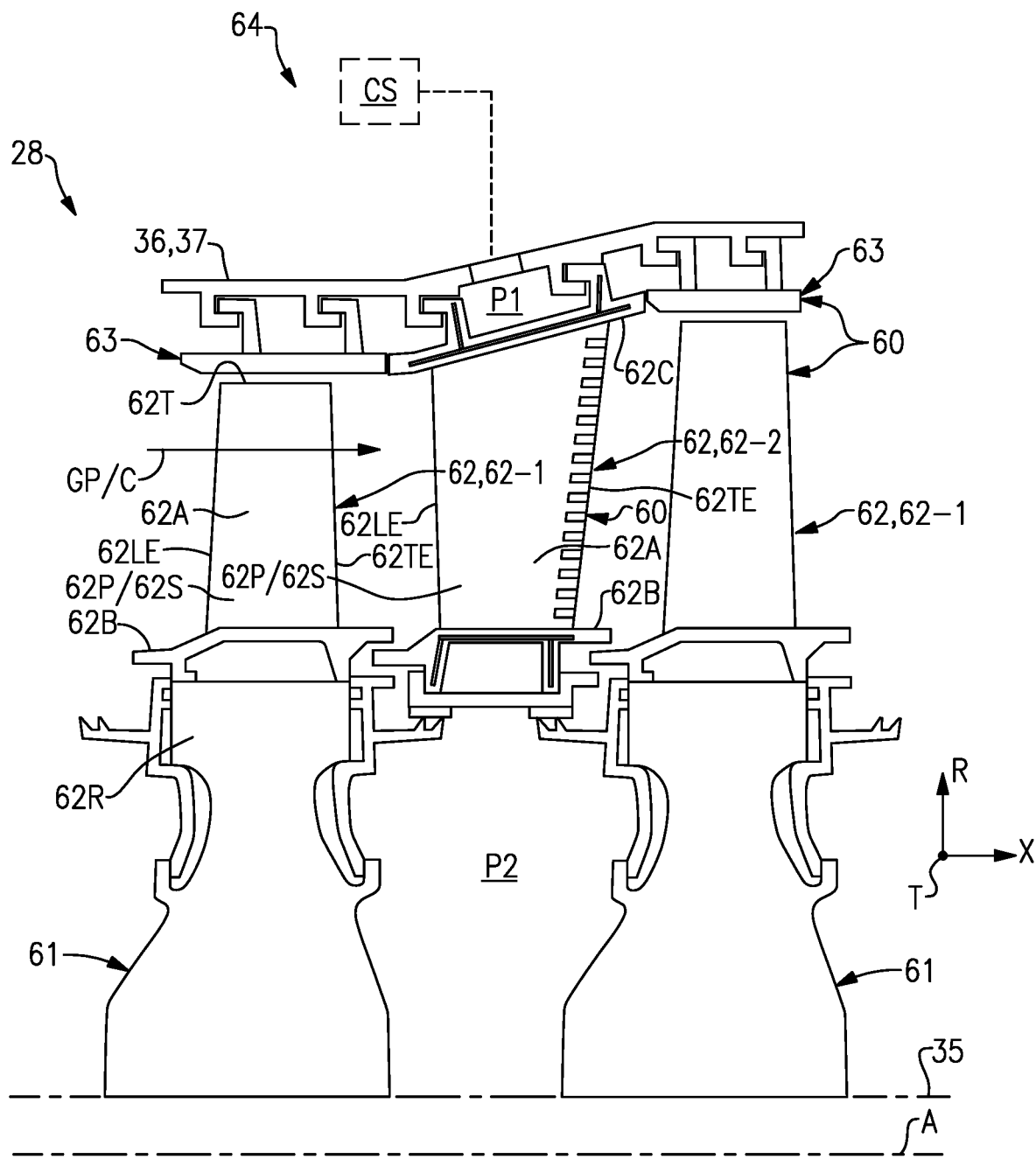
FIG. 2 schematically shows an airfoil arrangement.

FIG. 2 illustrates an exemplary section of a gas turbine engine, such as the turbine section 28 of FIG. 1. Although the disclosure primarily refers to the turbine section 28, it should be understood that other portions of the engine 20 can benefit from the teachings disclosed herein, including airfoils in the compressor section 24, combustor panels or liners in the combustor section 26, and other portions of the engine 20 that may be subject to elevated temperature conditions during engine operation. Other systems can benefit from the teachings disclosed herein, including gas turbine engines lacking a fan for propulsion. In this disclosure, like reference numerals designate like elements where appropriate and reference numerals with the addition of one-hundred or multiples thereof designate modified elements that are understood to incorporate the same features and benefits of the corresponding original elements.

The turbine section 28 includes a plurality of components 60 arranged relative to the engine axis A, including a rotor 61, one or more airfoils 62, and one or more blade outer air seals (BOAS) 63. Example airfoils 62 include rotatable blades 62-1 and static vanes 62-2. The rotor 61 is coupled to a rotatable shaft 35 (shown in dashed lines for illustrative purposes). The shaft 35 can be one of the shafts 40, 50 of FIG. 1, for example. The rotor 61 carries one or more blades 62-1 that are rotatable about the engine axis A in a gas path GP, such as the core flow path C.

Each airfoil 62 includes an airfoil section 62A extending in a spanwise or radial direction R from a first (e.g., inner) platform section 62B. Each blade 62-1 extends in the radial direction R from the platform section 62B to a tip portion 62T. Each vane 62-2 extends in the radial direction R from the first platform section 62B to a second (e.g., outer) platform section 62C. The platform sections 62B, 62C can bound or define a portion of the gas path GP. The airfoil section 62A generally extends in a chordwise or axial direction X between a leading edge 62LE and a trailing edge 62TE, and extends in a circumferential or thickness direction T between pressure and suction sides 62P, 62S. The pressure and suction sides 62P, 62S are joined at the leading and trailing edges 62LE, 62TE to establish an aerodynamic surface contour of the airfoil 62. The root section 62R of the blade 62-1 can be mounted to, or can be integrally formed with, the rotor 61. The vane 62-2 can be arranged to direct or guide flow in the gas path GP from and/or towards the adjacent blade(s) 62-1.

Each BOAS 63 can be spaced radially outward from the tip portion 62T of the blade 62-1. The BOAS 63 can include an array of seal arc segments that are circumferentially distributed or arranged in an annulus about an array of the airfoils 62 to bound the gas path GP.

The turbine section 28 can include at least one array of airfoils 62, including at least one array of blades 62-1 and at least one array of vanes 62-2, and can include at least one array of BOAS 63 arranged circumferentially about the engine axis A. The array of vanes 62-2 are spaced axially from the array of blades 62-1 relative to the engine axis A. The tip portions 62T of the blades 62-1 and adjacent BOAS 63 are arranged in close radial proximity to reduce the amount of gas flow that escapes around the tip portions 62T through a corresponding clearance gap.

The turbine section 28 includes a cooling arrangement 64 for providing cooling augmentation to the components 60 during engine operation. The cooling arrangement 64 include one or more cooling cavities or plenums P1, P2 defined by a portion of the engine static structure 36 such as the engine case 37. The plenum P2 can be at least partially defined or bounded by a rotatable portion of the engine 20, such as the rotor 61. One or more coolant sources CS (one shown) are configured to provide cooling air to the plenums P1, P2. The plenums P1, P2 are configured to receive pressurized cooling flow from the coolant source(s) CS to cool portions of the components 60 including the airfoils 62 and/or BOAS 63. Coolant sources CS can include bleed air from an upstream stage of the compressor section 24 (FIG. 1), bypass air, or a secondary cooling system aboard the aircraft, for example. Each of the plenums P1, P2 can extend in the circumferential direction T between adjacent airfoils 62 and/or BOAS 63.

FIGS. 3-4 and 5A-5D illustrate an exemplary gas turbine engine component 160 including an internal cooling arrangement 164. The component 160 can be any of the components disclosed herein, including a combustion liner or panel incorporated into the combustor section 26, and the BOAS 63 and airfoils 62 such as the blades 62-1 and vanes 62-2 of the turbine section 28. In the illustrative example of FIGS. 3-4, the component 160 is an airfoil 162 shown as a blade 162-1. The blade 162-1 can be a rotatable turbine blade incorporated into one or more rows of the turbine section 28.

Figure 3:
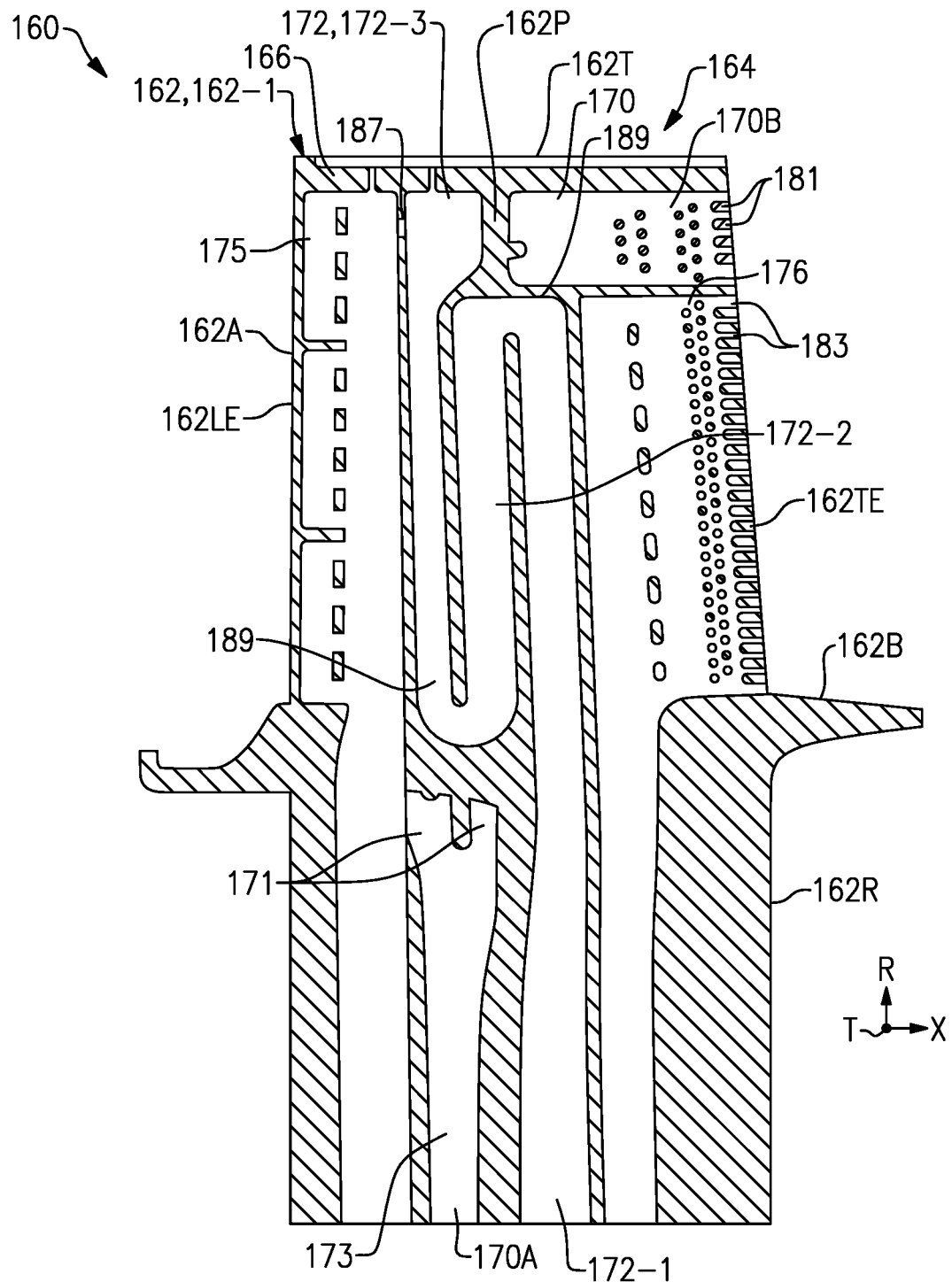
FIG. 3 illustrates a section view of a gas turbine engine component along line 3-3 of FIG. 5B.
Figure 4:
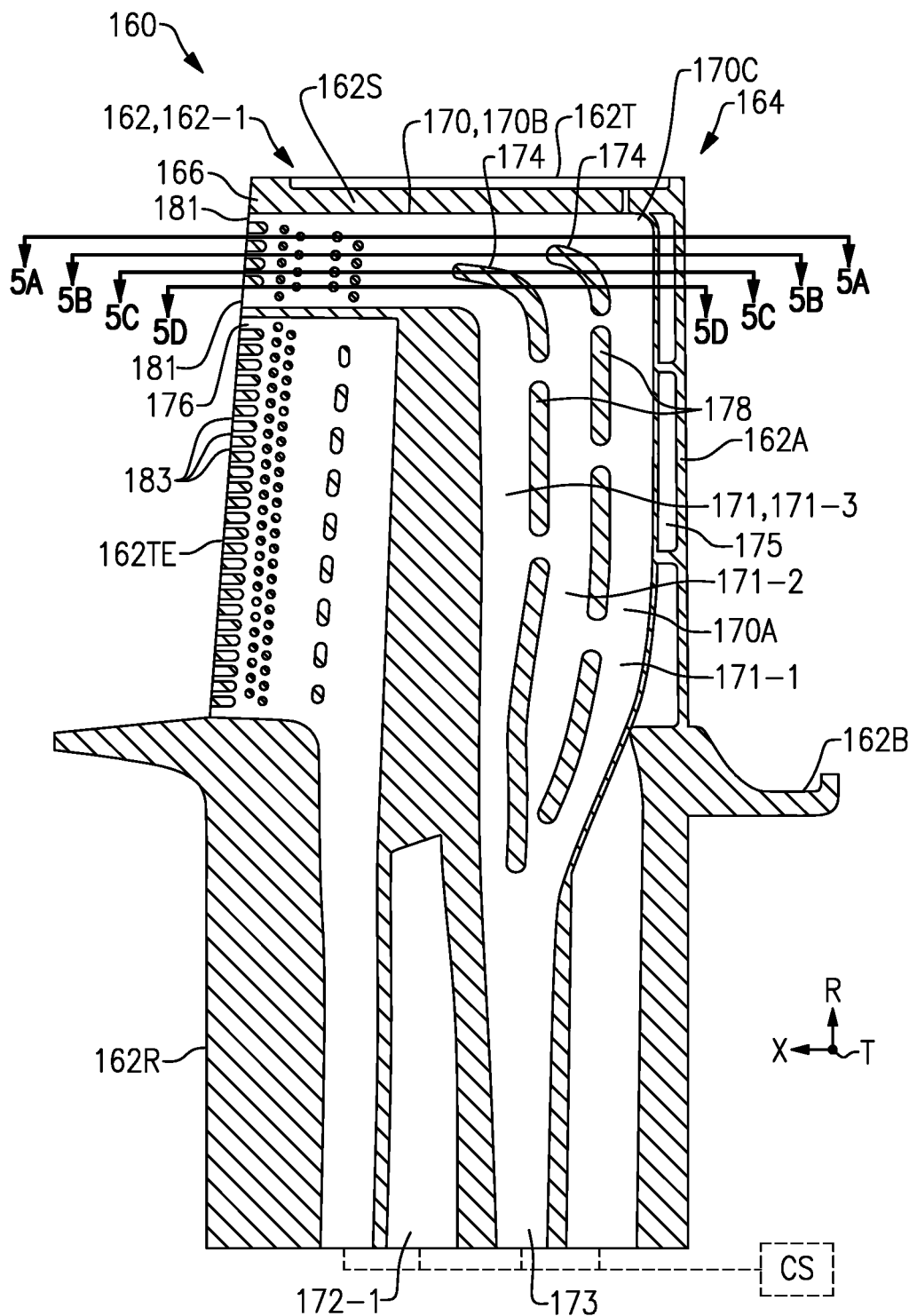
FIG. 4 illustrates another section view of the gas turbine engine component of FIG. 3 along line 4-4 of FIG. 5B.

Referring to FIGS. 3-4, the airfoil 162 includes an airfoil section 162A extending outwardly in a radial (e.g., first) direction R from a root section 162R to a tip portion 162T. The tip portion 162T can establish a terminal end of the airfoil section 162A. The airfoil section 162A can extend outwardly in the radial direction R from a platform section 162B to the tip portion 162T. In other examples, the airfoil 162 is a vane including inner and outer platform sections, as illustrated by the platform sections 62B, 62C of the vane 62-2 (FIG. 2). The root section 162R can be dimensioned to extend inwardly from the platform section 162B relative to the radial direction R. The root section 162R can be dimensioned to mount the airfoil 162 to a rotatable hub.

The airfoil section 162A includes an external wall 166 and at least one internal wall (or rib) 168, as illustrated in FIGS. 5A-5D. The external wall 166 can define pressure and suction sides 162P, 162S extending in a chordwise (e.g., second) direction X between a leading edge 162LE and a trailing edge 162TE. The pressure side 162P and suction side 162S can be spaced apart in a thickness (e.g., third) direction T between the leading edge 162LE and trailing edge 162TE.

The internal cooling arrangement 164 can include one or more cooling passages dimensioned to convey cooling flow to adjacent portions of the component 160. The cooling arrangement 164 can include a skin core (e.g., first) cooling passage 170, a serpentine (e.g., second) cooling passage 172, a leading edge (e.g., third) cooling passage 175, and a trailing edge (e.g., fourth) cooling passage 176. The cooling passages 170, 172, 175, 176 can be coupled to a coolant source CS (shown in dashed lines in FIG. 4 for illustrative purposes) to convey cooling flow to adjacent portions of the component 160. It should be understood that one or more of the cooling passages 170, 172, 175 and/or 176 can be omitted and/or combined, and fewer or more than four cooling passages may be utilized in accordance with the teachings disclosed herein. The cooling arrangement 164 can be established by the airfoil section 162A, platform section 162B and/or root section 162R. The internal wall 168 can extend in the chordwise direction X to establish a double wall arrangement that separates portions of the cooling arrangement 164, as illustrated in FIGS. 5A-5D.

Figure 5A:
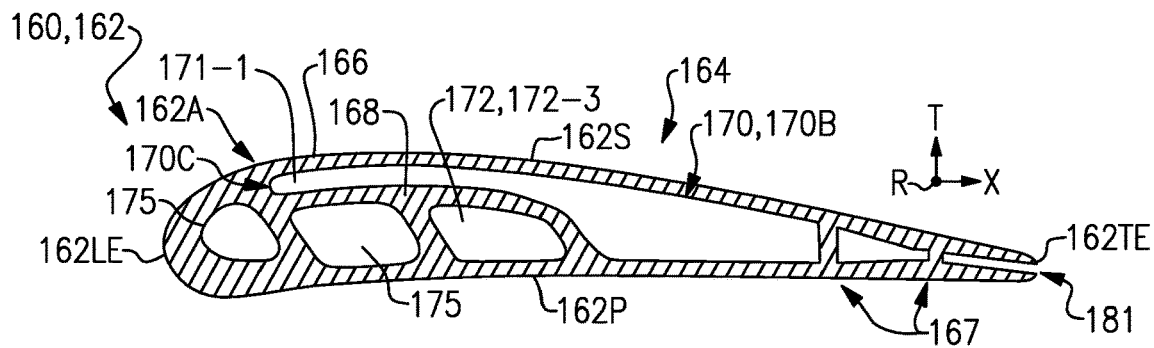
FIG. 5A is a sectional view taken along line 5A-5A of the component of FIG. 4.
Figure 5B:
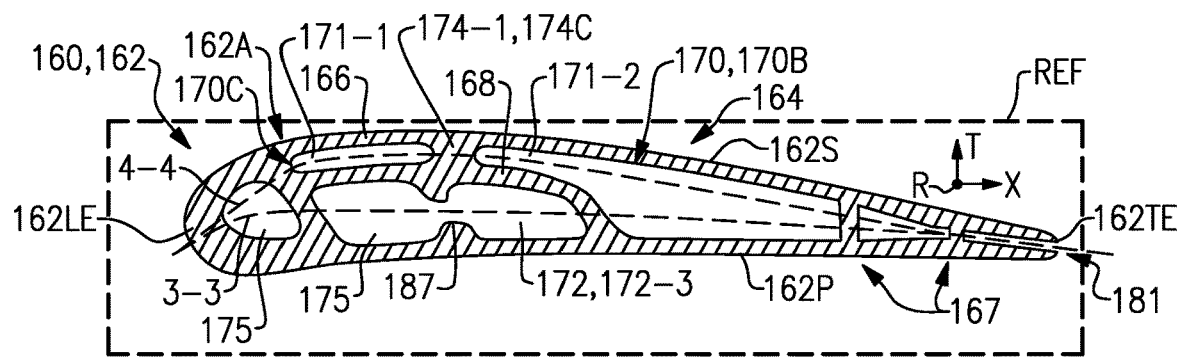
FIG. 5B is a sectional view taken along line 5B-5B of the component of FIG. 4.

The leading edge cooling passage 175 can be established adjacent to the leading edge 162LE of the airfoil 162. The trailing edge cooling passage 176 can be established adjacent to the trailing edge 162TE of the airfoil 162. The leading edge cooling passage 175 can be bounded by the external wall 166 along the leading edge 162LE (see also FIG. 5A). The trailing edge cooling passage 176 can be bounded by the external wall 166 along the trailing edge 162TE. The serpentine cooling passage 172 can be situated between the leading edge cooling passage 175 and trailing edge cooling passage 176 relative to the chordwise direction X. The skin core cooling passage 170 can extend aft of the leading edge cooling passage 175 relative to the chordwise direction X. Portions of the skin core cooling passage 170 can be aligned with the serpentine cooling passage 172, leading edge cooling passage 175 and/or trailing edge cooling passage 176 relative to the chordwise direction X. The cooling arrangement 164 can include at least one crossover passage 187 extending between and interconnecting the serpentine cooling passage 172 and leading edge cooling passage 175, as illustrated in FIGS. 3 and 5B. In other examples, each crossover passage 187 is omitted.

Referring to FIG. 4, with continuing reference to FIG. 3, the skin core cooling passage 170 can include a radial (e.g., first) section 170A and a tip flag (e.g., second) section 170B joined at a first bend (or junction) 170C. The first section 170A can extend in the radial direction R from the root section 162R. The tip flag section 170B can be established along or can otherwise be adjacent to the tip portion 162T of the airfoil 162. The tip flag section 170B can be dimensioned to extend in the chordwise direction X along the tip portion 162T from the first section 170A at the first bend 170C to the trailing edge 162TE of the airfoil 162 (see also FIGS. 5A-5D). The tip flag section 170B can extend transversely, such as at an approximately 90 degree angle, from the first section 170A at the first bend 170C. For the purposes of this disclosure, the terms "approximately," "about" and "substantially" mean±10 percent of the stated value or relationship unless otherwise indicated. Arrangement of the tip flag section 170B in a substantially axial or chordwise direction X can be utilized to maximize or otherwise increase internal convective heat transfer adjacent the tip portion 162T, which may have a relative lesser thickness than other portions of the airfoil 162. The tip flag section 170B can be utilized in combination with various configurations along the tip portion 162T, including a pressure side tip shelf and/or a tip squealer pocket (see, e.g., FIGS. 10-11).

The first section 170A of the skin core cooling passage 170 can include one or more branched paths 171. The branched paths 171 can include first, second, and third branched paths (indicated at 171-1 to 171-3) that establish a trifurcation. Although three branched paths 171 are illustrated, it should be understood that fewer or more than three branched paths 171 can be utilized in accordance with the teachings disclosed herein. The branched paths 171 can be dimensioned to branch outwardly from a trunk 173 of the first section 170A of the skin core cooling passage 170 at a position inward of the platform section 162B relative to the radial direction R (see also FIG. 6). The branched paths 171 serve to divide cooling flow conveyed by the trunk 173 to downstream portions of the skin core cooling passage 170. The third branched path 171-3 can be dimensioned to branch or divide from the trunk 173 at a first position, and the trunk 173 can be dimensioned to divide into the first and second branched paths 171-1, 171-2 at a second position radially outward of the first position relative to the radial direction R, as illustrated in FIG. 4.

Referring back to FIG. 3, the serpentine cooling passage 172 can include a first section 172-1, second section 172-2, and third section 172-3. The second section 172-2 can be dimensioned to interconnect the first section 172-1 and third section 172-3. The first section 172-1 can be dimensioned to extend outwardly from the root section 162R relative to the radial direction R. The third section 172-3 can be dimensioned to extend inwardly from the tip portion 162T relative to the radial direction R. The third section 172-3 can be dimensioned to substantially span between the platform section 162B and tip portion 162T. The first section 172-1 can be joined to the second section 172-2 at a bend 189. The third section 172-3 can be joined to the second section 172-2 at another bend 189. Each of the bends 189 can be dimensioned to turn approximately 180 degrees such that the bends 189 have a generally C-shaped geometry. The third section 172-3 can be forward of the first section 172-1 relative to the chordwise direction X, as illustrated in FIG. 3, although the opposite arrangement can be utilized.

The tip flag section 170B can include a first set of ports 181 established along the trailing edge 162TE of the airfoil 162 (see also FIGS. 5A-5C and 6). The trailing edge cooling passage 176 can include a second set of ports 183 along the trailing edge 162TE of the airfoil 162. The first set of ports 181 and second set of ports 183 can be dimensioned to eject cooling flow from the respective cooling passages 170, 176 to provide film cooling to external surfaces of the airfoil 162 adjacent the trailing edge 162TE. The second set of ports 183 can be established radially inward of the first set of ports 181 relative to the radial direction R. The first set of ports 181 and second set of ports 183 can be at least partially aligned in the thickness direction T (see also FIG. 9).

The double wall arrangement established by the skin core cooling passage 170 relative to the internal wall 168 can serve to at least partially thermally isolate or shield adjacent portions of the serpentine cooling passage 172 and/or leading edge cooling passage 175 from elevated temperatures caused by hot gases communicated along exposed surfaces of the airfoil 162, such as along the suction side 162S of the airfoil 162. For example, the internal wall 168 can extend inwardly from the tip portion 162T relative to the radial direction R, as illustrated in FIG. 10. The tip flag section 170B of the skin core cooling passage 170 can be situated on an opposite side of the internal wall 168 from portions of the serpentine cooling passage 172 and/or leading edge cooling passage 175 relative to the thickness direction T, as illustrated in FIGS. 5A and 10. At least the third section 172-3 of the serpentine cooling passage 172 and/or portions of the leading edge cooling passage 175 can be established between the inner wall 168 and the pressure side 162P, and the branched paths 171 of the first cooling passage 170 and/or tip flag section 170B can be established between the internal wall 168 and the suction side 162S, as illustrated in FIGS. 5A-5D, although the opposite arrangement can be utilized. The shielding can reduce heat pickup of cooling flow in the serpentine cooling passages 172 and/or leading edge cooling passage 175 by reducing net heat flux from the relatively hot external wall 166 along adjacent surfaces of the suction side 162S. Reduction in heat pickup of the cooling flow can improve cooling effectiveness by maximizing or otherwise increasing the potential temperature gradient between the external gasses and the relatively cooler internal cooling flow through the cooling arrangement 164.

Figure 6:
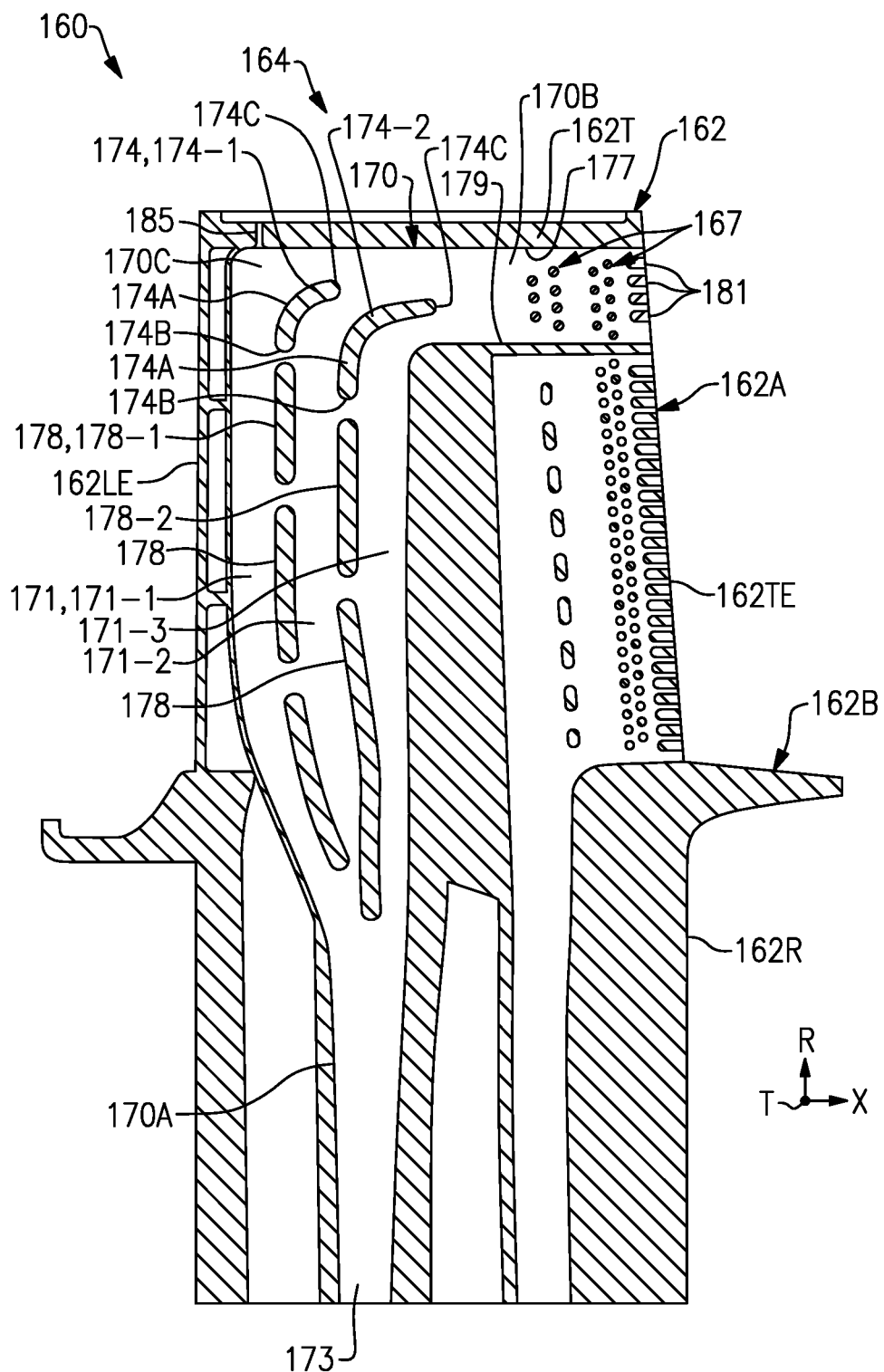
FIG. 6 is a sectional view of the component of FIG. 3 taken along a first cooling passage.
Figure 7:
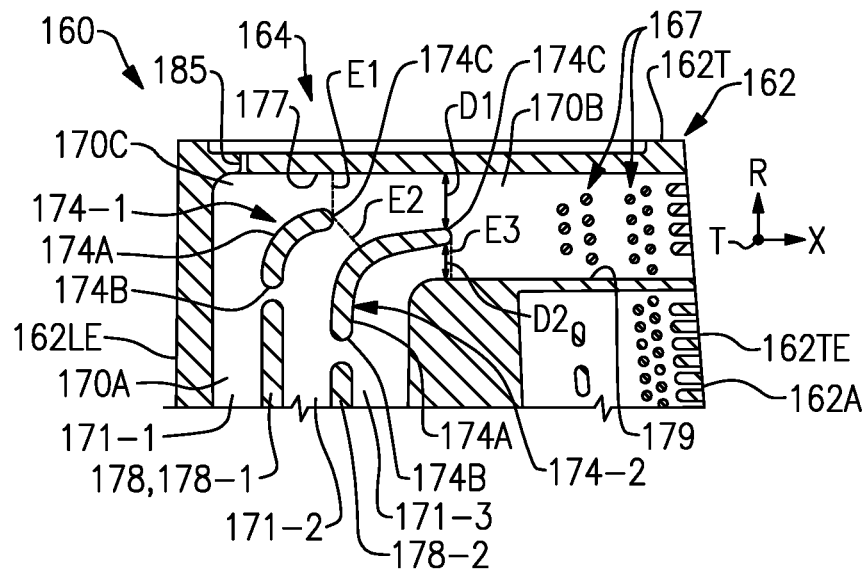
FIG. 7 is a sectional view of selected portions of the component of FIG. 6.

Referring to FIGS. 6-7, with continuing reference to FIG. 4, the branched paths 171 can be established by one or more elongated ribs 178. The cooling passages 172, 175, 176 are omitted from FIGS. 6-7 for illustrative purposes. The ribs 178 can include a first rib 178-1 and a second rib 178-2 opposed to the first rib 178-1. The ribs 178-1, 178-2 can be dimensioned to extend along the first section 170A of the first cooling passage 170. One or more of the ribs 178 can be aligned with the platform section 162B with respect to the radial direction R. The ribs 178-1, 178-2 can be dimensioned to separate adjacent pairs of the branched paths 171-1, 171-2, 171-3. The ribs 178 can serve to provide convective cooling and improve rigidity of adjacent portions of the airfoil 162, including reduced compressive strain and improved distribution of shearing loads between the external wall 166 and internal wall 168.

The branched paths 171 can be established by at least one or more turning vanes 174. The turning vanes 174 can be dimensioned to convey cooling flow from the first section 170A to the tip flag section 170B of the skin core cooling passage 170. The turning vanes 174 can serve as heat augmentation features that provide convective cooling to adjacent portions of the airfoil 162.

The turning vanes 174 can include a first turning vane 174-1 and a second turning vane 174-2 that opposes the first turning vane 174-1. It should be understood that fewer or more than two turning vanes 174 can be utilized in accordance with the teachings disclosed herein. The component 160 can include other heat augmentation features at various positions along the cooling arrangement 164, such as pedestals, trip strips, fins, dimples, raised protrusions, etc., to meter flow and/or provide convective cooling to adjacent portions of the component 160. For example, the skin core cooling passage 170 can include one or more rows of pedestals 167. The pedestals 167 can be dimensioned to span between opposed surfaces of the tip flag section 170B (see FIGS. 5A-5D). The component 160 can also include film cooling holes coupled to various positions along the cooling arrangement 164 to provide film cooling augmentation.

Figure 5C:
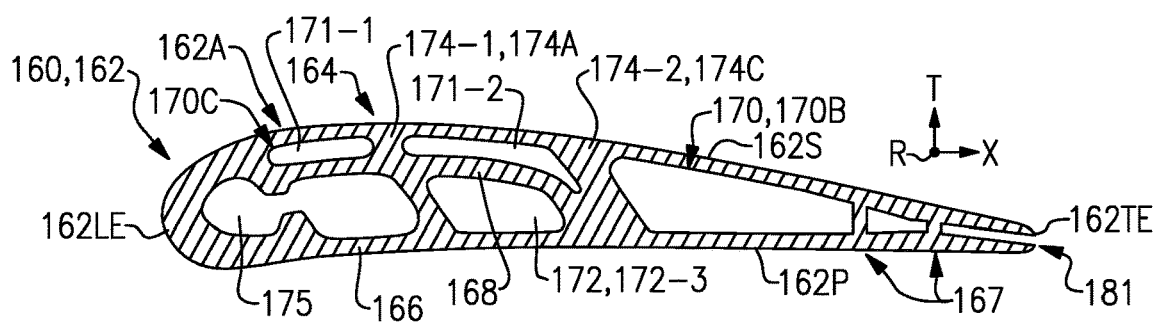
FIG. 5C is a sectional view taken along line 5C-5C of the component of FIG. 4.
Figure 5D:
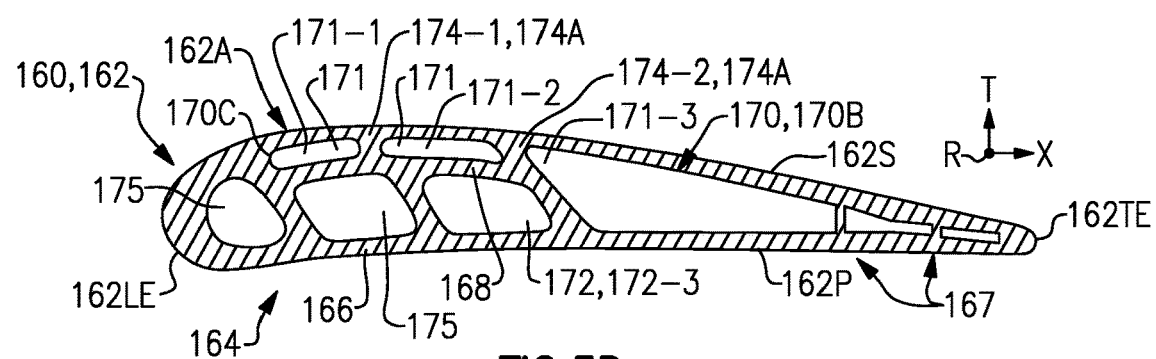
FIG. 5D is a sectional view taken along line 5D-5D of the component of FIG. 4.

Each of the turning vanes 174 can be dimensioned to span between opposed walls bounding the skin core cooling passage 170. For example, each of the turning vanes 174 can be dimensioned to interconnect the internal wall 168 and external wall 166, as illustrated in FIGS. 5B-5D, which can improve rigidity of adjacent portions of the airfoil 162, including along the tip portion 162T adjacent the bend 170C.

The turning vanes 174 can have various geometries to direct flow along the skin core cooling passage 170. Each of the turning vanes 174 can include a main body 174A extending between a first (e.g., upstream) end 174B and a second (e.g., downstream) end 174C. The turning vane 174 can be dimensioned such that a length of the main body 174A between the ends 174B, 174C has a substantially arcuate shaped profile. The arcuate profile of the turning vanes 174 can reduce turbulence and separation, improve filling of the cooling passage 170 with cooling flow, and reduce dead zones or stagnation through adjacent portions of the skin core cooling passage 170, including through the first bend 170C, which can improve cooling effectiveness and component durability. The arcuate profile can be a simple curve or compound curve established by one or more radii. The turning vanes 174 can be dimensioned to extend between approximately 45 degrees and approximately 90 degrees about a respective point to establish the arcuate profile. Other geometries can be utilized, such as one or more linear segments joined at an angle.

The turning vanes 174 can be arranged at various positions and orientations relative to each other, the cooling arrangement 164 and the airfoil 162. The turning vanes 174 can be dimensioned such that the upstream ends 174B are axially forward of the downstream ends 174C relative to the chordwise direction X. The turning vanes 174 can be dimensioned such that the upstream ends 174B are inward of the downstream ends 174C with respect to the radial direction R. The turning vanes 174 and bend 170C can be outward of the trailing edge cooling passage 176 relative to the radial direction R (see FIG. 9).

The turning vanes 174 can cooperate to substantially or completely fluidly separate the branched paths 171. Each of the turning vanes 174 can be arranged such that the branched paths 171 extend along the respective turning vanes 174 and then join together along the tip flag section 170B to diffuse the cooling flow. The internal wall 168 can be dimensioned to extend in the chordwise direction X such that portions of the branched paths 171 adjacent to the turning vanes 174 are bounded in the thickness direction T between the internal wall 168 and the external wall 166, as illustrated in FIGS. 5B-5D.

The upstream ends 174B of the turning vanes 174 can be aligned with a respective one of the ribs 178 relative to the chordwise direction X, which can serve to reduce turbulence through the skin core cooling passage 170. For example, the upstream end 174B of the first turning vane 174-1 can be at least partially aligned with the first rib 178-1 relative to the chordwise direction X. The upstream end 174B of the second turning vane 174-2 can be at least partially aligned with the second rib 178-2 relative to the chordwise direction X. Aligning the turning vanes 174 and ribs 178 can reduce losses that may otherwise be caused by turbulence.

The main body 174A of each turning vane 174 can be continuous between the first and second ends 174B, 174C to fluidly isolate adjacent portions of the branched paths 171. In the illustrative example of FIG. 8, each turning vane 274 of component 260 can be segmented or interrupted between upstream and downstream ends 274B, 274C to establish at least one crossover passage 275. Each crossover passage 275 can be dimensioned to interconnect an adjacent pair of the branched paths 271. The crossover passages 275 can serve to increase flow from a radially inward one of the branched paths 271 to a radially outward one of the branched path 271, which may be assisted by centrifugal forces caused by rotation of the airfoil 262 during engine operation.

The skin core cooling passage 170 can include at least one purge passage 185. The serpentine cooling passage 172 can include at least one purge passage 191 (FIG. 10). Each purge passage 185, 191 can interconnect the respective cooling passage 170, 172 and a respective aperture along an external surface of the airfoil 162. For example, the purge passage 185 can extend from the first bend 170C. The purge passage 191 can extend from the third section 172-3 of the serpentine cooling passage 172. The purge passages 185, 191 can be dimensioned to eject particulate from the cooling passages 170, 172 in operation, which can reduce a likelihood of blockage such as through the first bend 170C of the skin core cooling passage 170. The purge passage 185 can also reduce flow separation and recirculating flows in the first bend 170C of the skin core cooling passage 170. The purge passages 185, 191 can be formed utilizing various techniques, including a casting or drilling operation.

The tip flag section 170B of the cooling passage 170 can be dimensioned to expand or flair outwardly from the branched paths 171 to diffuse cooling flow communicated from the branched paths 171. For example, the tip flag section 170B can be established along a reference plane REF (illustrated in dashed lines in FIG. 5B for illustrative purposes). The reference plane REF can intersect the leading and trailing edges 162LE, 162TE and the pressure and suction sides 162P, 162S of the airfoil 162. The tip flag section 170B can be dimensioned to expand or flair outwardly in the thickness direction T along the reference plane REF from the first, second and/or third branched paths 171-1, 171-2, 171-3 towards the trailing edge 162TE, as illustrated by the contouring of the branched paths 171-2, 171-3 of FIGS. 5B-5C. The internal wall 168 can be dimensioned to follow at least the first and/or second branched paths 171-2 in the reference plane REF, as illustrated in FIG. 5B.

Referring to FIGS. 9-11, with continuing reference to FIGS. 6-7, the turning vanes 174 can be dimensioned to diffuse or otherwise communicate cooling flow through the branched paths 171 and towards the tip flag section 170B. Each of the turning vanes 174 can be dimensioned to establish one or more aspect ratios to establish the cooling arrangement 164. For the purposes of this disclosure, the term "aspect ratio" means a ratio of a width to a height at a position along the turning vane 174. The height dimension can have a major component in the radial direction R or axial direction X. The width dimension can have a major component in the thickness direction T. The width can be established by a span of the turning vane 174 between the external wall 166 and internal wall 168. The aspect ratio may be the same or may differ at positions along a length of the main body 174A of the turning vane 174. For example, the aspect ratio of the first turning vane 174-1 can be substantially constant between the upstream end 174B and downstream end 174C.

The aspect ratio of the second turning vane 174-2 can be substantially constant or can vary between the upstream end 174B and downstream end 174C. For example, the upstream end 174B of the second turning vane 174-2 can be dimensioned to establish a first aspect ratio W1:H1 defined by a first width W1 (FIG. 10) and a first height H1 (FIG. 9). The downstream end 174C of the second turning vane 174-2 can be dimensioned to establish a second aspect ratio W2:H2 defined by a second width W2 (FIG. 11) and a second height H2 (FIG. 9). The widths W1, W2 and heights H1, H2 can be defined as a maximum dimension at the respective upstream and downstream ends 174B, 174C excluding any radiusing. The second aspect ratio W2:H2 can be equal to or greater than the first aspect ratio W1:H1. For example, the first aspect ratio W1:H1 can be less than or equal to about 3:2, or more narrowly greater or equal to about 1:1. The second aspect ratio W2:H2 can be greater than or equal to about 2:1, or more narrowly greater than or equal to about 3:1. The first height H1 and second height H2 can be approximately equal. A ratio W2:W1 of the second width W2 to the first width W1 can be greater than or equal to 2:1, or more narrowly can be greater than or equal to 3:1, such that the second turning vane 174-2 flairs or extends outwardly in a direction along a length of the main body 174A from the first end 174B towards the second end 174C, as illustrated by FIGS. 10-11. The diffusion scheme can serve to reduce the expansion ratio through the skin core cooling passage 170 with respect to a first position (e.g., inlets) immediately upstream of the turning vanes 174 and a second position (e.g., outlets) immediately downstream of the turning vanes 174.

The airfoil section 162A includes a radially inwardly facing wall 177 and a radially outwardly facing wall 179 that opposes the radially inward facing wall 177, as illustrated in FIGS. 6 and 9. The walls 177, 179 are dimensioned to extend in the chordwise direction X to bound the skin core cooling passage 170 along the tip flag section 170B. The turning vanes 174 can be spaced apart from the walls 177, 179. The downstream end 174C of the second turning vane 174-2 can be aligned with the radially outward facing wall 179 relative to the chordwise direction X, which can serve to improve flow attachment through the third branched path 171-3 along the radially outward facing wall 179 and can reduce a likelihood of dead zones through the skin core cooling passage 170.

The downstream end 174C of the first turning vane 174-1 can be radially outward of, or can otherwise be offset from, the downstream end 174C of the second turning vane 174-2 relative to the radial direction R, which can reduce a likelihood of dead zones in the skin core cooling passage 170. The downstream end 174C of the first turning vane 174-1 can be offset from the downstream end 174C of the second turning vane 174-2 relative to the chordwise direction X. Offsetting or staggering the downstream ends 174C of the turning vanes 174-1, 174-2 utilizing the techniques disclosed herein can improve load distribution by reducing an area in which the airfoil 162 is unsupported across the skin core cooling passage 170, including adjacent the tip portion 162T which can have a relatively lesser thickness than other portions of the airfoil section 162A.

The downstream end 174C of the second turning vane 174-2 can be arranged relative to the radially inwardly facing wall 177 and radially outwardly facing wall 179 relative to the radial direction R. Referring to FIG. 7, a first distance D1 can be established between the downstream end 174C of the second turning vane 174-2 and the radially inwardly facing wall 177. A second distance D2 can be established between the downstream end 174C of the second turning vane 174-2 and the radially outwardly facing wall 179. The first and second distances D1, D2 can be established as the minimum distances between the downstream end 174C of the second turning vane 174-2 and the respective walls 177, 179. A ratio D2:D1 of the second distance D2 divided by the first distance D1 can be between approximately 1:4 and 1:2, such as about 1:3. The disclosed ratio D2:D1 can be utilized to reduce flow separation through the third branched path 171-3 and along the radially outwardly facing wall 179.

The turning vanes 174 can establish a set of exits of the branched paths 171, as illustrated by exits E1, E2, E3 in FIG. 7 (shown in dashed lines for illustrative purposes). A first exit E1 of the first branched path 171-1 can be established by a minimum distance between the downstream end 174C of the first turning vane 174-1 and the radially inwardly facing wall 177. A second exit E2 of the second branched path 171-2 can be established by a minimum distance between the downstream end 174C of the first turning vane 174-1 and an adjacent portion of the second turning vane 174-2. A third exit E3 of the third branched path 171-3 can be established by a minimum distance between the downstream end 174C of the second turning vane 174-2 and the radially outwardly facing wall 179. The turning vanes 174 can be dimensioned such that the cross sectional areas of the exits E1-E3 are within 10 percent or 20 percent of each other, or more narrowly can be substantially equal to each other. Utilizing the disclosed cross sectional areas of the exits E1-E3 disclosed herein, losses can be reduced by limiting an amount of acceleration of cooling flow through the branched paths 171 prior to diffusing the cooling flow along the tip flag section 170B.

In operation, cooling flow can be conveyed by the coolant source CS (FIG. 4) to the cooling passages 170, 172, 175, 176 at one or more inlets or plenums established in the root section 162R. The cooling flow can be communicated to downstream portions of the cooling passages 170, 172, 175, 176, including through the branched paths 171 and tip flag section 170B of the skin core cooling passage 170, to provide cooling augmentation to adjacent portions of the component 160. At least one of the serpentine cooling passage 172 and/or leading edge cooling passage 175 can be at least partially thermally shielded by the skin core cooling passage 170 and internal wall 168. After picking up heat due to convective heat transfer the cooling airflow can be ejected from the component 160 into the adjacent gas path and/or can be communicated to another portion of the engine.

Figure 13:
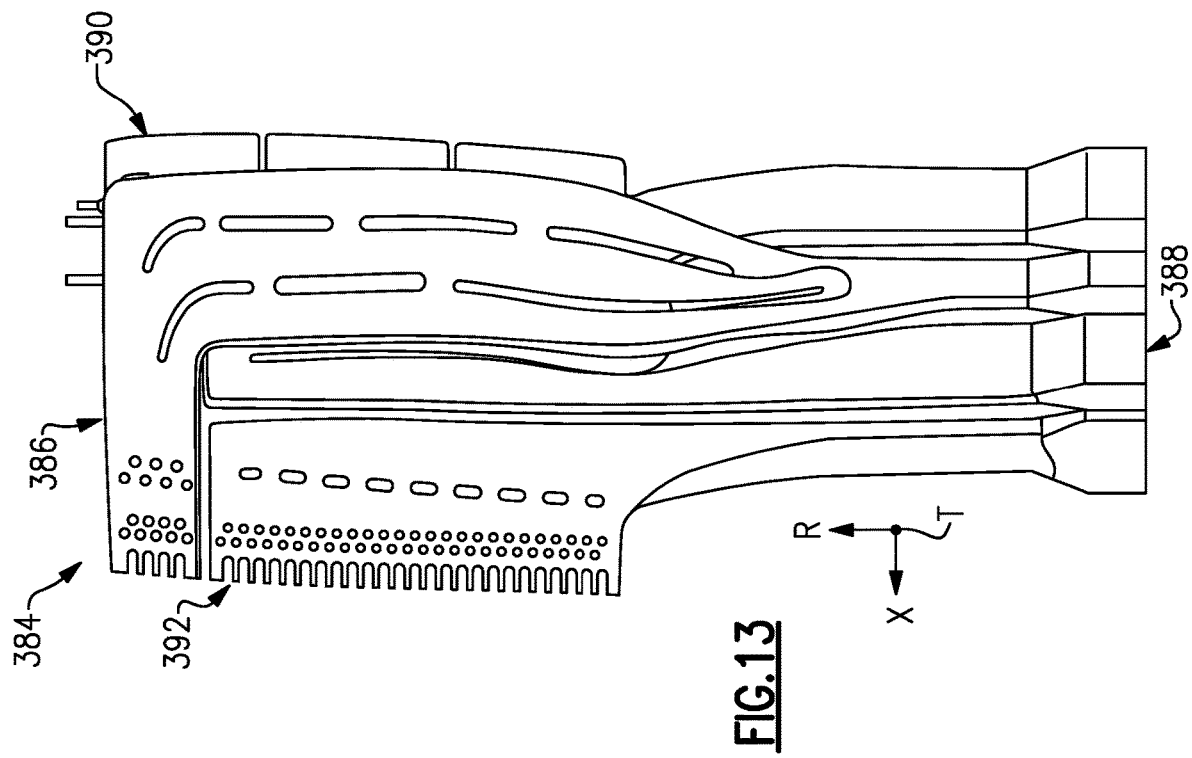
FIG. 13 illustrates another perspective view of the casting core assembly of FIG. 12.
Figure 12:
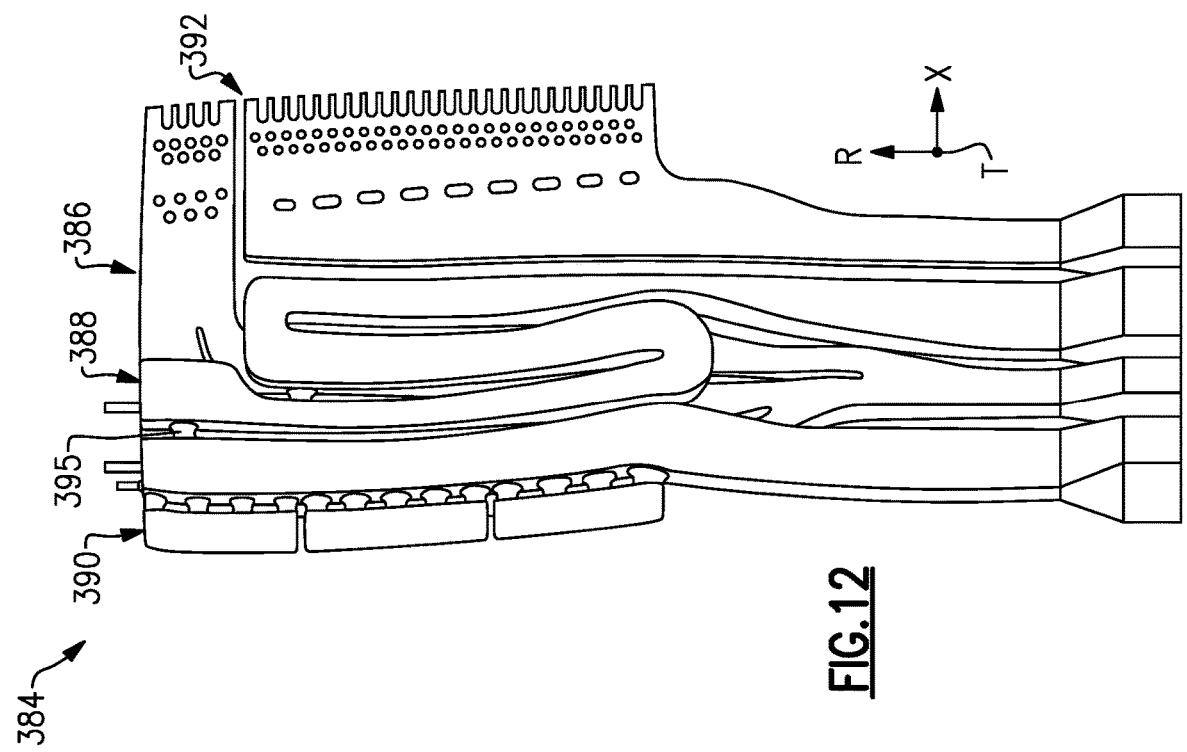
FIG. 12 illustrates a perspective view of a casting core assembly.
Figure 14:
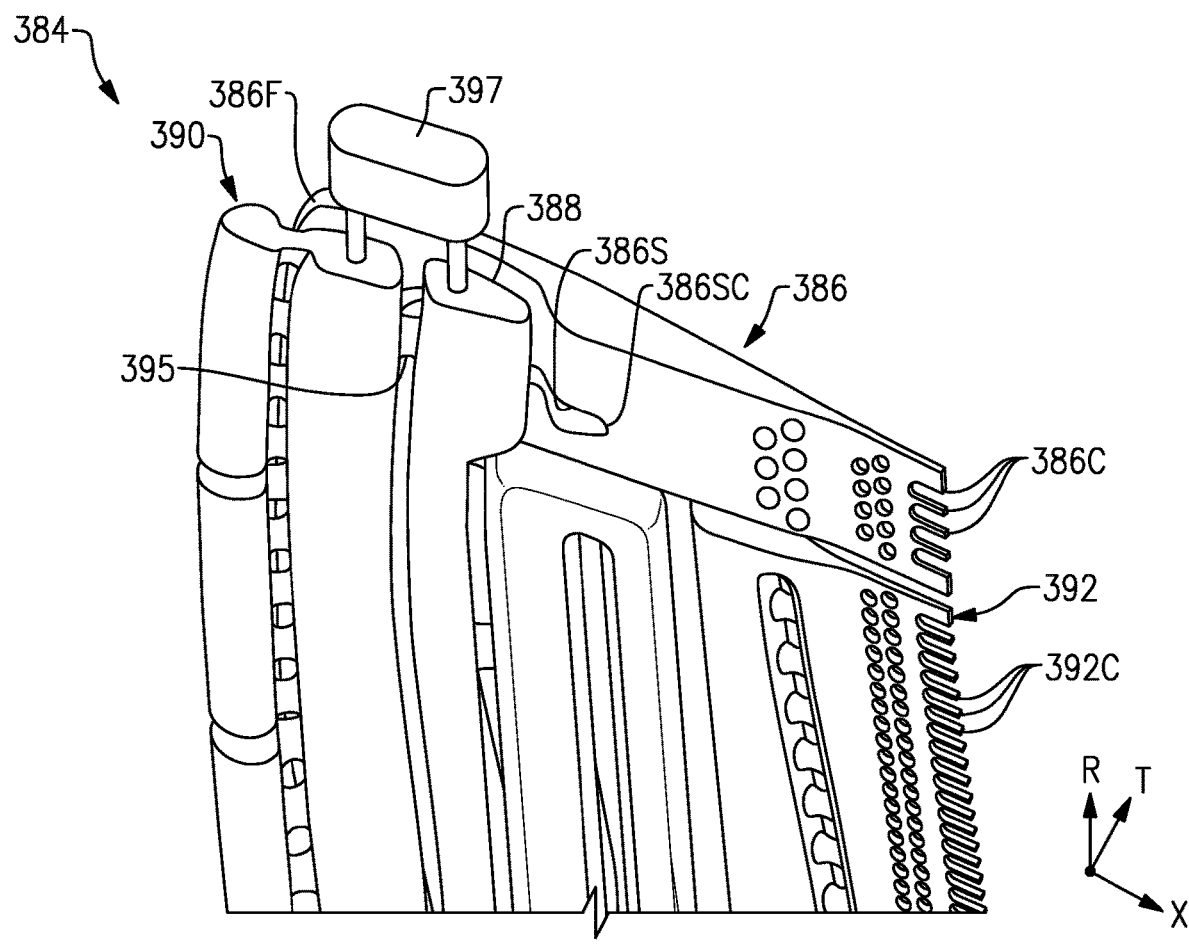
FIG. 14 illustrates a perspective view of selected portions of the casting core assembly of FIG. 12.

FIGS. 12-14 illustrate a casting core assembly 384 for a gas turbine engine component. The casting core assembly 384 may be utilized to establish any of the cooling arrangements or schemes disclosed herein, including the internal cooling arrangement 164. The casting core assembly 384 can include a skin (e.g., first) core 386, serpentine (e.g., second) core 388, leading edge (e.g., third) core 390, and/or (e.g., fourth) trailing edge core 392. It should be understood that one or more of the cores 386, 388, 390 and/or 392 can be omitted and/or combined, and fewer or more than four cores may be utilized in accordance with the teachings disclosed herein. The cores 386, 388, 390 and/or 392 can be utilized to form one or more cooling passages in the gas turbine engine component to convey cooling flow during operation.

The cores 386, 388, 390, 392 can be arranged at various positions and orientations relative to each other. For example, the serpentine core 388 and/or skin core 386 can be aft of the leading edge core 390 relative to a chordwise (or first) direction X. The serpentine core 388 can be spaced apart from, and can be forward of, the trailing edge core 392 relative to the chordwise direction X.

Figures 15, 16:
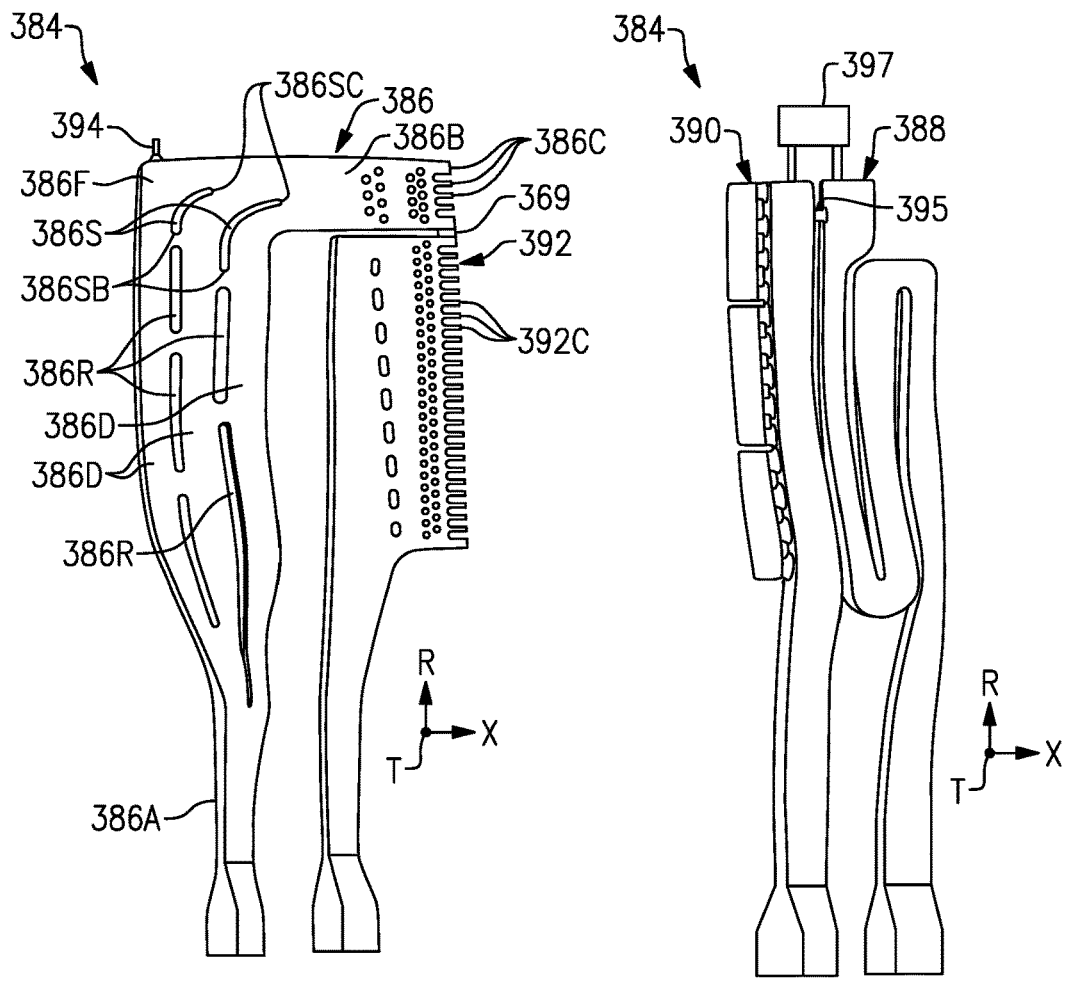
FIG. 15 illustrates an isolated view of cores of the casting core assembly of FIG. 12.
FIG. 16 illustrates another isolated view of another core of the casting core assembly of FIG. 12.

The skin core 386 can correspond to a first cooling passage of a gas turbine engine component, such as the skin core cooling passage 170. The serpentine core 388 can correspond to a second cooling passage of the gas turbine engine component, such as the serpentine cooling passage 172. The leading edge core 390 can correspond to a third cooling passage of the gas turbine engine component, such as the leading edge cooling passage 175. An isolated view of the serpentine core 388 and leading edge core 390 is illustrated in FIG. 16. The trailing edge core 392 can correspond to a fourth cooling passage of the gas turbine engine component, such as the trailing cooling passage 176. An isolated view of the skin core 386 and trailing edge core 392 is illustrated in FIG. 15.

Referring to FIG. 15, with continuing reference to FIGS. 12-14, the skin core 386 can include a first portion 386A and a tip flag portion 386B extending from the first portion 386A at a first bend 386F. The first portion 386A can correspond to the first section 170A, and the tip flag portion 386B can correspond to the tip flag section 170B of the skin core cooling passage 170. The tip flag portion 386B can be dimensioned to expand outwardly from the first bend 386F to at least partially wrap about an adjacent portion of the serpentine core 388, as illustrated by FIG. 14.

The tip flag portion 386B can be at least partially aligned with the trailing edge core 392 relative to the thickness direction T. For example, the tip flag portion 386B can include a first row of protrusions 386C. The first row of protrusions 386C can correspond to the first row of exit ports 181. The trailing edge core 392 can include a second row of protrusions 392C. The second row of protrusions 392C can correspond to the second row of exit ports 183. The skin core 386 and trailing edge core 392 can be arranged such that the first row of protrusions 386C are substantially aligned with the second row of protrusions 392C relative to a thickness direction T (see also FIG. 14).

The skin core 386 can include at least one protrusion 394 extending from the first bend 386F. Each protrusion 394 can correspond to a respective purge passage 185.

The tip flag portion 386B of the skin core 386 and the trailing edge core 392 can be coupled to each other by a connector 369. In other examples, the connector 369 is omitted.

The skin core 386 can include at least one or more arcuate slots 386S. The arcuate slots 386S can correspond to one or more of the turning vanes 174. Each of the arcuate slots 386S can be dimensioned to extend between a first end 386SB and a second end 386SC to establish a substantially arcuate shaped profile. The skin core 386 can include a plurality of branched sections 386D along the first section 386A. Each of the branched sections 386D can correspond to a respective one of the branched paths 171 along the first section 170A of the skin core cooling passage 170. The branched sections 386D can be dimensioned to bound one or more of the arcuate slots 386S and then join along the tip flag portion 386B.

Figure 8:
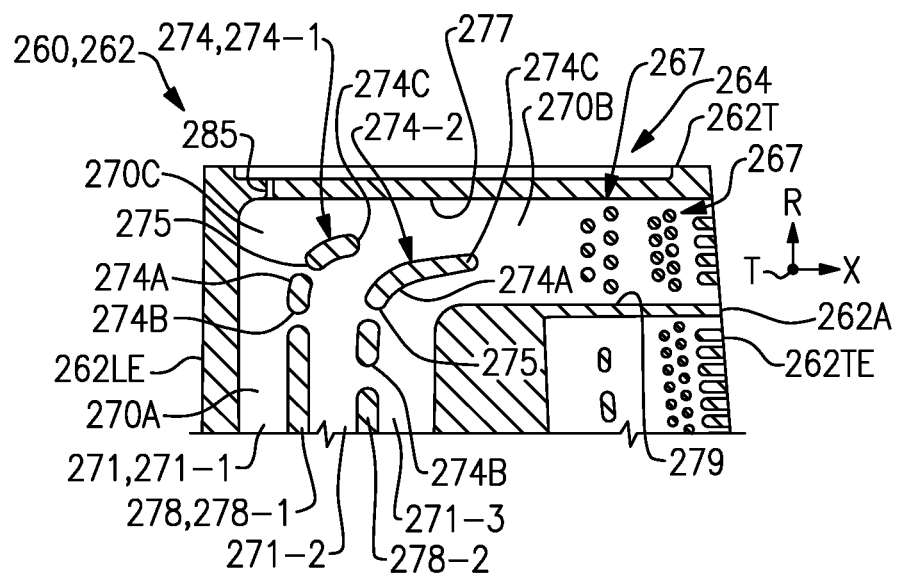
FIG. 8 is a sectional view of a first cooling passage of another exemplary gas turbine engine component.
Figure 18:
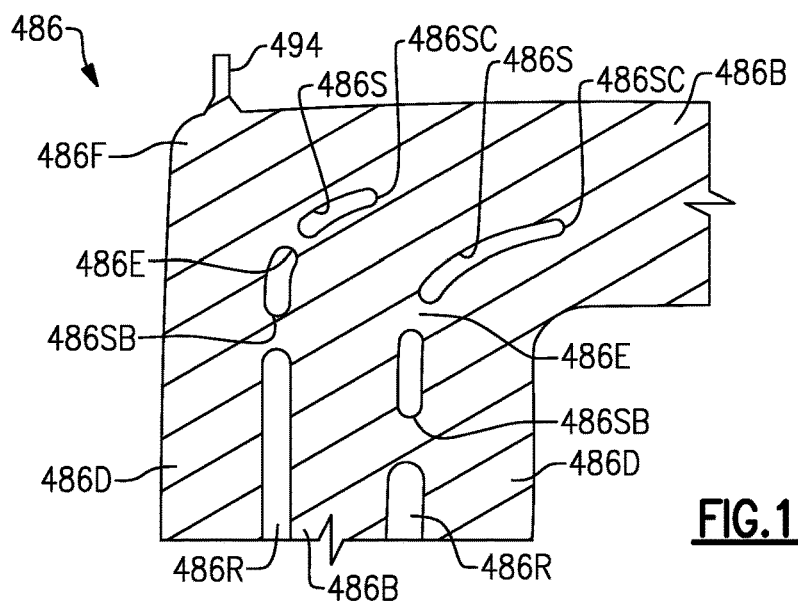
FIG. 18 illustrates a sectional view of selected portions of the casting core assembly of FIG. 17 as viewed from the opposite side.

The arcuate slot 386S can be continuous or uninterrupted between the first end 386SB and second end 386SC. In the illustrative example of FIG. 18, skin core 486 includes at least one or more bridges 486E spanning between an adjacent pair of branched sections 486D such that an arcuate slot 486S is interrupted between the first and second ends 486SB, 486SC (see also FIG. 17). Each of the bridges 386E can correspond to a respective one of the crossover passages 275 (FIG. 8).

Still referring to FIG. 15, the first portion 386A of the skin core 386 can include at least one or more elongated slots 386R bounded by an adjacent pair of the branched sections 386D. Each of the elongated slots 386R can correspond to respective one of the ribs 178. The first end 386SB of each of the arcuate slots 386S can be aligned with a respective one of the elongated slots 386R relative to the chordwise direction X.

The skin core 386 and serpentine core 388 can be arranged in a spaced relationship such that the first cooling passage 170 and serpentine cooling passage 172 established by the respective skin core 386 and serpentine core 388 are established on, and extend along, opposite sides of the internal wall 168 of the airfoil 162 relative to the thickness direction T (see e.g., FIGS. 5A-5D).

Referring to FIG. 16, with continuing reference to FIGS. 12-14, the casting core assembly 384 can include at least one connector 395 that joins the leading edge core 390 and serpentine core 388. Each connector 395 can correspond to a respective crossover passage 187 (FIG. 3). The leading edge core 390 and serpentine core 388 can be coupled to each other by a second connector 397, which can correspond to a position external to the resultant gas turbine engine component. The connectors 395, 397 can serve to fix or otherwise limit relative movement between the leading edge core 390 and serpentine core 388 during formation of the respective component and can simplify positioning of the cores 388, 390 as a unit.

Figure 17:
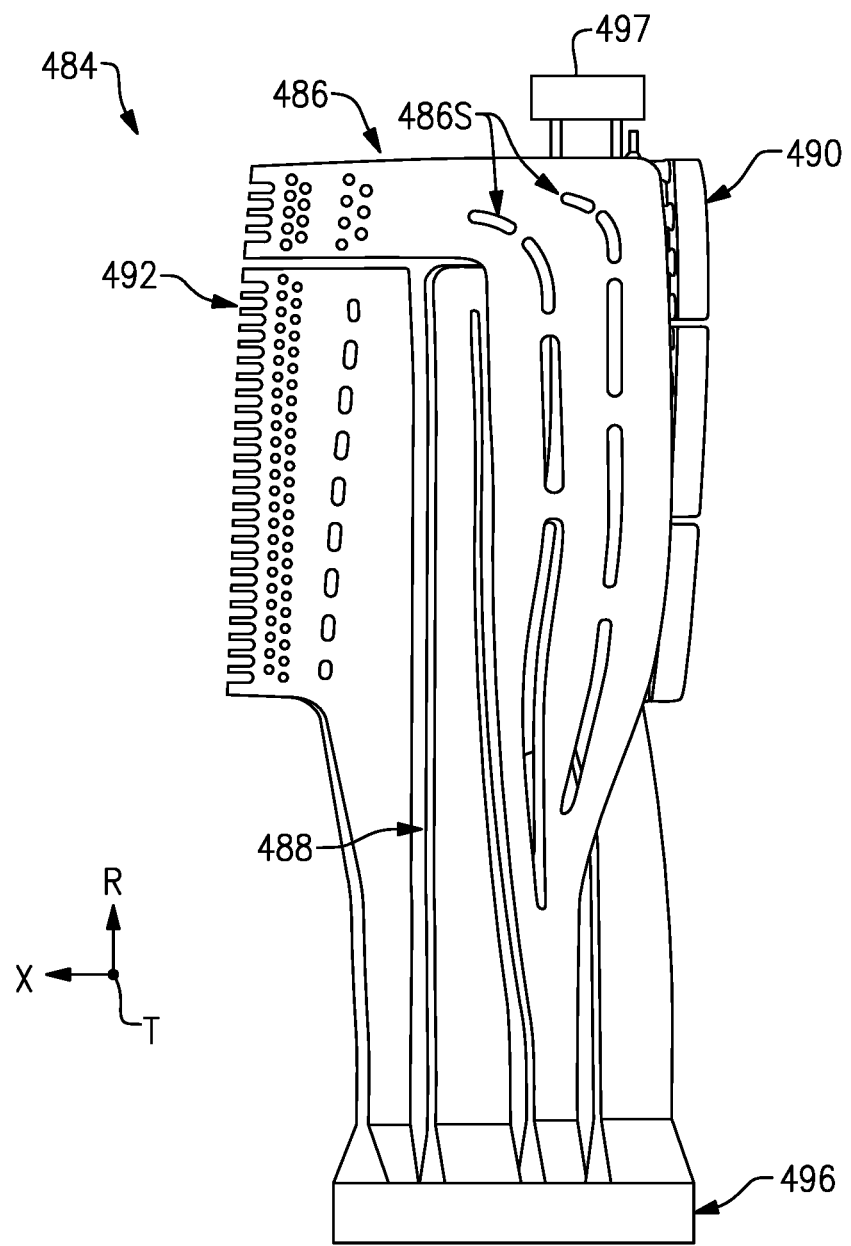
FIG. 17 illustrates a perspective view of another exemplary casting core assembly.

Referring to FIG. 17, cores 486, 488, 490, 492 can be joined together by a third connector 496 to establish a core assembly 484. The third connector 496 can be dimensioned to establish a plenum in the root section 162R of the airfoil 162, which can be coupled to the coolant source CS to convey cooling flow to the corresponding cooling passages 170, 172, 175, 176 (see FIG. 4). The leading edge core 490 and serpentine core 488 can be coupled to each other by a second connector 497. The connectors 496, 497 can serve to improve positioning of the core assembly 484 during formation of the respective gas turbine engine component. Joining the cores 386/486, 388/488, 390/490 and/or 392/492 together utilizing the techniques disclosed herein, including during a core injection and manufacturing process, can improve casting process capability by improving internal and external wall control, relative core displacement and core true position tolerance during wax injection and subsequent metal pour operations during the investment casting process.

Figure 19:
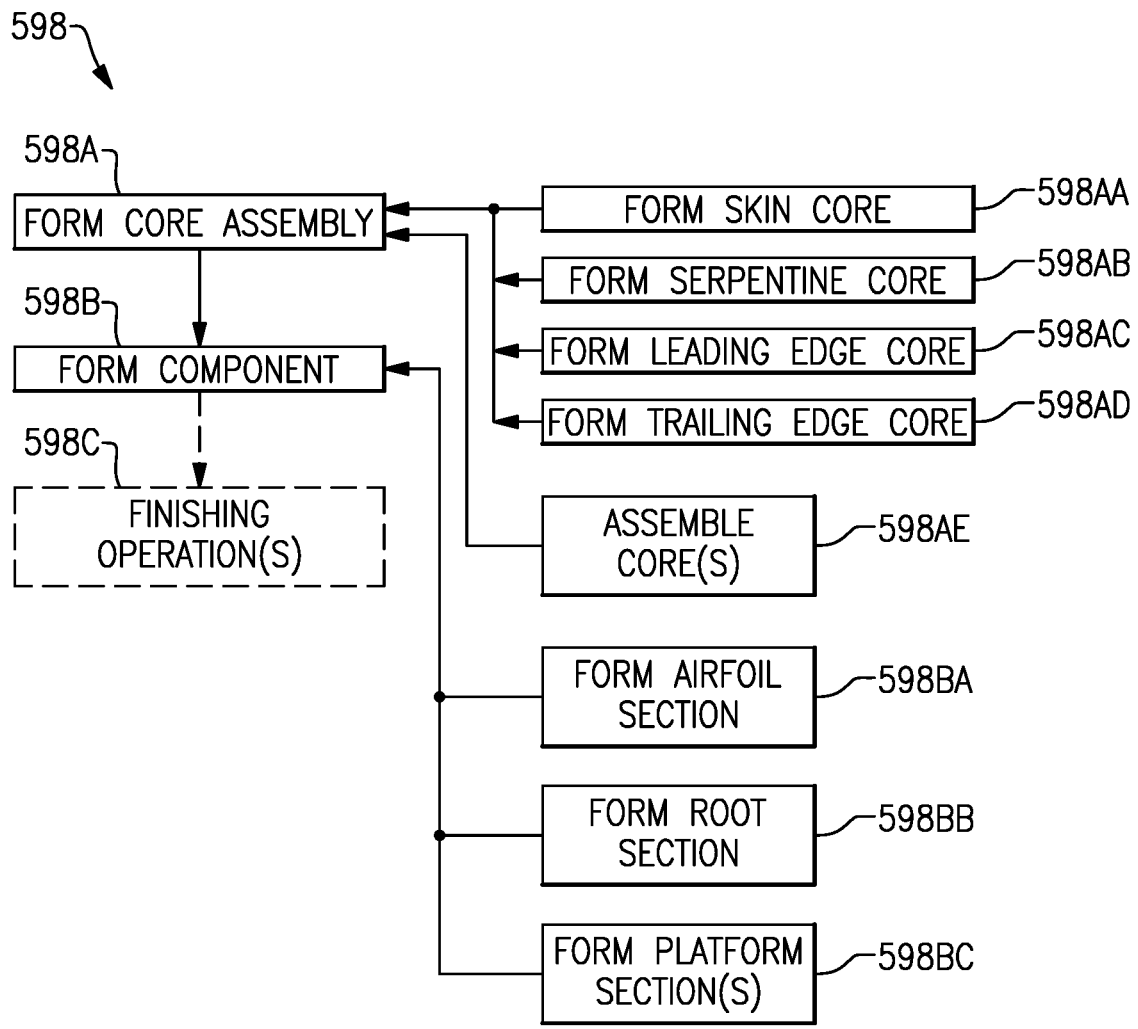
FIG. 19 illustrates a method of forming a gas turbine engine component.

FIG. 19 illustrates a method in a flowchart 598 for forming a component for a gas turbine engine. Method 598 can be utilized to form any of the gas turbine engine components disclosed herein, including the components 160, 260 (e.g., airfoil 162) and cooling arrangements 164, 264. Method 598 can be utilized with any of the core assemblies disclosed herein, including core assembly 384, 484. Fewer or additional steps than are recited below can be performed within the scope of this disclosure, and the recited order of steps is not intended to limit this disclosure. Reference is made to the component 160 and core assembly 384 for illustrative purposes.

At step 598A, a core assembly 384 is formed. Step 598A can include forming one or more cores to establish the core assembly 384. For example, a skin (or first) core 386 can be formed at step 598AA. The skin core 386 can correspond to a first cooling passage of the gas turbine engine component, such as the skin core cooling passage 170. A serpentine (or second) core 388 can be formed at step 598AB. The serpentine core 388 can correspond to a second cooling passage of the gas turbine engine component, such as the serpentine cooling passage 172. A leading edge (or third) core 390 can be formed at step 598AC. The leading edge core 390 can correspond to a third cooling passage of the gas turbine engine component, such as the leading edge cooling passage 175. In examples, steps 598AB and 598AC are performed concurrently such that the serpentine core 388 and leading edge core 390 are coupled with one or more connectors 395, 397 to establish a unitary component (FIGS. 12 and 16). A trailing edge (or fourth) core 392 can be formed at step 598AD. The trailing edge core 392 can correspond to a fourth cooling passage of the gas turbine engine component, such as the trailing edge cooling passage 176.

Various techniques can be utilized to form the casting core assembly 384 including each of the cores 386, 388, 390, 392. Exemplary techniques can include core die tooling, injection molding, flexible tooling, fugitive core, lithographic tooling, and/or advanced additive manufacturing processes. Other techniques can include laser powder bed metal fusion additive manufacturing techniques such as direct metal laser sintering (DMLS) and selective laser sintering (SLS) processes. Various materials can be utilized to form the casting core assembly 384 including the cores 386, 388, 390, 392. Exemplary materials include non-metallic materials such as ceramics and metallic materials such as refractory metals. Materials forming the respective cores 386, 388, 390, 392 can be the same or can differ.

Step 598A can include assembling the cores 386, 388, 390 and/or 392 together to establish the core assembly 384 at step 598AE. The cores 386, 388, 390 and/or 392 can be formed as separate and distinct components prior to assembling the cores 386, 388, 390, 392 at step 598AE. Step 598AE can include coupling the cores 386, 388, 390 and/or 392 to each other at a position corresponding to a root section 162R of the airfoil R, as illustrated by the core assembly 484 (FIG. 17). In examples, two or more of the cores 386, 388, 390, 392 can be injection molded or otherwise formed in a single die.

At step 598B, the component 160 (e.g., airfoil 162) is fabricated or otherwise formed around the core assembly 384. Step 598B can utilize an investment casting technique in which the core assembly 384 is situated in a mold. The core assembly 384 can be coated with a wax material to establish a predetermined component geometry. The wax material can be coated with another material, such as a metallic or ceramic slurry that can be hardened into a shell. The wax material can be melted out of the shell and molten material such as a metal or metal alloy can be deposited into the resultant cavity. Various materials can be utilized to form the component 160, including metallic materials. Exemplary metallic materials can include metal and metal alloys such as a high temperature nickel alloy. The deposited metal material can solidify to form the component 160. The core assembly 384 can be leached out or otherwise removed to establish the cooling arrangement 164 within the component 160, and the shell can be removed. Investment casting techniques are generally known, but utilizing investment casting techniques to form the components and cooling arrangements disclosed herein is not known.

Step 598B can include forming the airfoil section 162A of the airfoil 162 at step 598BA. Step 598BA can include forming the airfoil section 162A including the external wall 166 and internal wall 168 to establish a double wall arrangement. The double wall arrangement can improve local thermal cooling effectiveness of the component 160. Step 598B can occur such that the tip flag section 170B of the skin core cooling passage 170 is established between the suction side 162S of the airfoil 162 and a first side of the internal wall 168 relative to the thickness direction T, and such that the serpentine cooling passage 172 is established between the pressure side 162P of the airfoil 162 and a second side of the internal wall 168 opposed to the first side of the internal wall 168 relative to the thickness direction T, as illustrated in FIGS. 5A-5D.

Step 598B can include forming the root section 162R of the airfoil 162 at step 598BB and/or forming one or more platform sections of the airfoil 162 at step 598BC. The platform sections can include inner and/or outer platform sections, such as the platform section 162B of the airfoil 162.

One or more finishing operations may be performed at step 598C. Exemplary finishing operations can include heat treating the component 160, milling or grinding operation to establish a predetermined geometry of the component 160, electrical discharge machining (EDM) and/or laser drilling cooling holes in the component, and depositing one or more coatings onto internal and/or external surfaces of the component 160 such as a thermal barrier coating (TBC).

It should be understood that relative positional terms such as "forward," "aft," "upper," "lower," "above," "below," and the like are with reference to the normal operational altitude of the engine and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
an airfoil section extending in a radial direction from a root section to a tip portion, the airfoil section having an external wall and an internal wall, the external wall defining pressure and suction sides extending in a chordwise direction between a leading edge and a trailing edge, and the pressure and suction sides spaced apart in a thickness direction between the leading edge and the trailing edge; and
wherein the airfoil section establishes an internal cooling arrangement comprising:
a first cooling passage including a first section and a tip flag section, the first section extending in the radial direction from the root section, and the tip flag section extending in the chordwise direction along the tip portion from the first section to the trailing edge;
wherein the first section includes a plurality of branched paths established by at least one turning vane that interconnects the internal wall and the external wall, the at least one turning vane having an arcuate profile and arranged such that the plurality of branched paths join together along the tip flag section;
wherein the internal wall extends in the chordwise direction such that the plurality of branched paths are bounded in the thickness direction between the internal wall and the external wall adjacent the at least one turning vane;
a serpentine cooling passage including a first section, a second section and a third section, the second section interconnecting the first section and the third section, and the first section extending outwardly from the root section and the third section extending inwardly from the tip portion relative to the radial direction; and
wherein the tip flag section and the third section of the serpentine cooling passage are situated on opposite sides of the internal wall relative to the thickness direction.

2. The airfoil as recited in claim 1, wherein the plurality of branched paths includes first, second and third branched paths, and the at least one turning vane includes a first turning vane and a second turning vane that cooperate to separate the first, second and third branched paths.

3. The airfoil as recited in claim 2, wherein each of the first and second turning vanes extends between an upstream end and a downstream end, the upstream end of the first turning vane is aligned with a first rib relative to the chordwise direction, the upstream end of the second turning vane is aligned with a second rib relative to the chordwise direction, and the first and second ribs cooperate to separate the first, second and third branched paths.

4. The airfoil as recited in claim 3, wherein the tip flag portion is established along a reference plane intersecting the leading and trailing edges and the pressure and suction sides, and the tip flag portion expands outwardly in the thickness direction along the reference plane from the second branched path towards the trailing edge, and the internal wall follows along the second branched path in the reference plane.

5. The airfoil as recited in claim 3, wherein:
the upstream end of the second turning vane establishes a first aspect ratio that is less than or equal to about 3:2;
the downstream end of the second turning vane establishes a second aspect ratio that is greater than or equal to about 2:1; and
the airfoil section includes a radially inwardly facing wall and a radially outwardly facing wall extending in the chordwise direction to bound the tip flag section, and the downstream end of the second turning vane is aligned with the radially outwardly facing wall relative to the chordwise direction.

6. The airfoil as recited in claim 3, wherein each of the first and second turning vanes is segmented between the upstream and downstream ends to establish at least one crossover passage interconnecting an adjacent pair of the branched paths.

7. The airfoil as recited in claim 3, wherein the serpentine cooling passage is established between the internal wall and the pressure side, and the branched paths are established between the internal wall and the suction side.

8. The airfoil as recited in claim 7, wherein:
the airfoil section extends in the radial direction from a platform section to the tip portion; and
the branched paths are dimensioned to branch outwardly from a trunk of the first section at a position inward of the platform section relative to the radial direction.

9. The airfoil as recited in claim 7, wherein the tip flag portion includes a first set of exit ports along the trailing edge, and the internal cooling arrangement comprises:
a leading edge cooling passage bounded by the external wall along the leading edge; and
a trailing edge cooling passage including a second set of exit ports along the trailing edge that are inward of the first set of exit ports relative to the radial direction.

10. The airfoil as recited in claim 1, wherein the airfoil is a turbine blade.

11. An airfoil for a gas turbine engine comprising:
an airfoil section extending in a radial direction from a root section to a tip portion, the airfoil section having an external wall defining pressure and suction sides extending in a chordwise direction between a leading edge and a trailing edge, and the pressure and suction sides spaced apart in a thickness direction between the leading edge and the trailing edge;
a platform section between the root section and the tip portion relative to the radial direction;
wherein the airfoil section establishes an internal cooling arrangement comprising:
a first cooling passage including a first section and a tip flag section joined at a junction, the first section extending in the radial direction from the root section, and the tip flag section extending in the chordwise direction along the tip portion from the junction to the trailing edge;
wherein the first section includes a plurality of branched paths dimensioned to branch outwardly from a trunk of the first section at a position inward of the platform section relative to the radial direction, and the plurality of branched paths are dimensioned to join together along the junction; and
wherein the plurality of branched paths includes first, second and third branched paths separated by a plurality of turning vanes at the junction.

12. The airfoil as recited in claim 11, wherein the position includes a first position and a second position, the third branched path branches from the trunk at the first position, and the trunk divides into the first and second branched paths at the second position radially outward of the first position relative to the radial direction.

13. The airfoil as recited in claim 11, wherein the airfoil is a turbine blade.

14. An airfoil for a gas turbine engine comprising:
an airfoil section extending in a radial direction from a root section to a tip portion, the airfoil section having an external wall defining pressure and suction sides extending in a chordwise direction between a leading edge and a trailing edge, the pressure and suction sides spaced apart in a thickness direction between the leading edge and the trailing edge, and wherein the airfoil section includes an internal wall; and
a platform section between the root section and the tip portion relative to the radial direction;
wherein the airfoil section establishes an internal cooling arrangement comprising:
a first cooling passage including a first section and a tip flag section joined at a junction, the first section extending in the radial direction from the root section, and the tip flag section extending in the chordwise direction along the tip portion from the junction to the trailing edge;
wherein the first section includes a plurality of branched paths dimensioned to branch outwardly from a trunk of the first section at a position inward of the platform section relative to the radial direction, and the plurality of branched paths are dimensioned to join together along the junction;
a serpentine cooling passage including a first section, a second section and a third section, the second section interconnecting the first section and the third section, and the first section extending outwardly from the root section and the third section extending inwardly from the tip portion relative to the radial direction; and
wherein the tip flag section and the third section of the serpentine cooling passage are situated on opposite sides of the internal wall relative to the thickness direction.

15. The airfoil as recited in claim 14, wherein the serpentine cooling passage is established between the internal wall and the pressure side, and the branched paths are established between the internal wall and the suction side.

16. The airfoil as recited in claim 15, wherein the airfoil is a turbine blade.

* * * * *